(12) United States Patent
Noh et al.

(10) Patent No.: US 11,468,823 B2
(45) Date of Patent: Oct. 11, 2022

(54) VIDEO WALL INCLUDING MULTIPLE DISPLAYS WITH REDUCED AFTERIMAGE

(71) Applicant: LG ELECTRONICS INC., Seoul (KR)

(72) Inventors: Hyunchul Noh, Seoul (KR); Sangyeop Jeon, Seoul (KR); Sangyeol Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/422,627

(22) PCT Filed: Jan. 14, 2020

(86) PCT No.: PCT/KR2020/000692
§ 371 (c)(1),
(2) Date: Jul. 13, 2021

(87) PCT Pub. No.: WO2020/149619
PCT Pub. Date: Jul. 23, 2020

(65) Prior Publication Data
US 2022/0093034 A1    Mar. 24, 2022

(30) Foreign Application Priority Data
Jan. 14, 2019  (KR) ......................... 10-2019-0004400

(51) Int. Cl.
*G06F 11/14* (2006.01)
*G09G 3/30* (2006.01)
(Continued)

(52) U.S. Cl.
CPC ......... *G09G 3/2096* (2013.01); *G06F 3/1446* (2013.01); *G09G 3/3208* (2013.01);
(Continued)

(58) Field of Classification Search
CPC ............... G09G 3/2096; G09G 3/3208; G09G 2300/026; G09G 2310/0232; G09G 2340/04
See application file for complete search history.

(56) References Cited

U.S. PATENT DOCUMENTS 5,982,951 A * 11/1999 Katayama .......... H04N 5/23238
382/284
2012/0050811 A1 * 3/2012 Koike ....................... G06T 1/60
358/1.16
(Continued)

FOREIGN PATENT DOCUMENTS

KR         10-1557027 B1    10/2015
KR    10-2016-0132170 A    11/2016
(Continued)

*Primary Examiner* — Sanghyuk Park
(74) *Attorney, Agent, or Firm* — Birch, Stewart, Kolasch & Birch, LLP

(57) ABSTRACT

The present disclosure relates to a video wall. The video wall according to an embodiment of the present disclosure comprises: a plurality of displays disposed adjacent to each other; an image divider configured to divide an input image into a plurality of images; and at least one controller configured to control a plurality of image display apparatuses, wherein in response to a video displayed on the plurality of image display apparatuses being repeatedly played back, the controller is configured to store a boundary area and transmit the stored boundary area to adjacent image display apparatuses, and the respective image display apparatuses synthesize a received boundary area with an image area to be displayed, and display a portion of the synthesized image. Accordingly, an occurrence of black areas may be reduced while reducing afterimage on the video wall comprising the plurality of displays.

15 Claims, 27 Drawing Sheets

(51) Int. Cl.
  *G09G 3/20*      (2006.01)
  *G09G 3/3208*    (2016.01)
  *G06F 3/14*      (2006.01)

(52) U.S. Cl.
  CPC ............... *G09G 2300/026* (2013.01); *G09G 2310/0232* (2013.01); *G09G 2340/04* (2013.01)

(56)             References Cited

U.S. PATENT DOCUMENTS

2015/0220300 A1    8/2015  Reynaga
2019/0197971 A1*   6/2019  Zha ..................... G09G 3/3406
2020/0126510 A1*   4/2020  Shiokawa .............. G09G 5/003

FOREIGN PATENT DOCUMENTS

KR    10-2017-0026878 A    3/2017
KR    10-2018-0020830 A    2/2018

* cited by examiner

FIG. 9B

| conv | = | conv | bn | relu | | | |
| --- | --- | --- | --- | --- | --- | --- | --- |
| conv fc | = | conv dw | bn | relu | conv pw | bn | relu |
| fc | = | fc | bn | relu | | | |

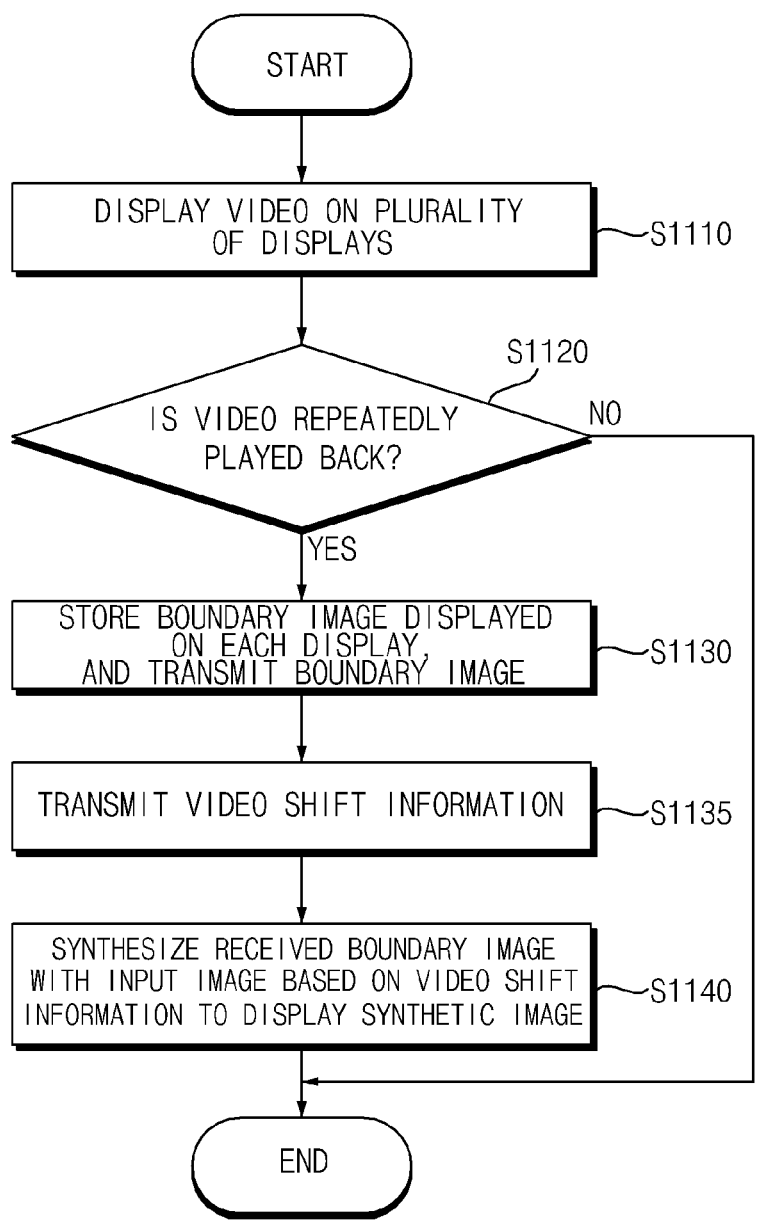

FIG. 14A
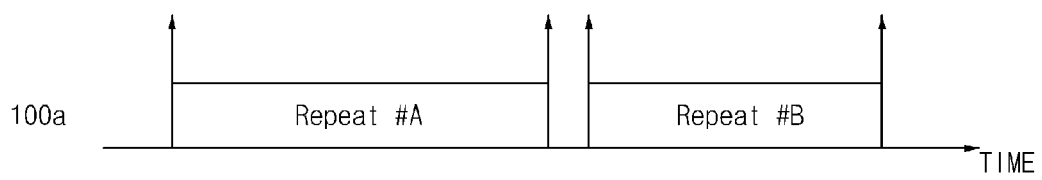
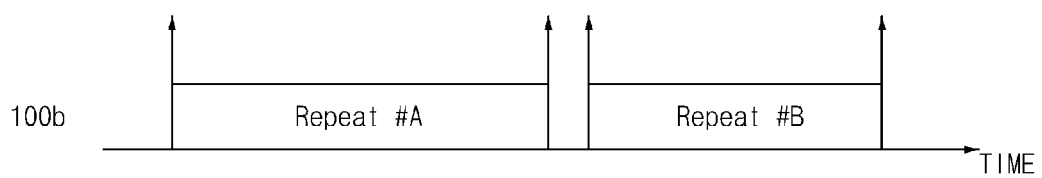

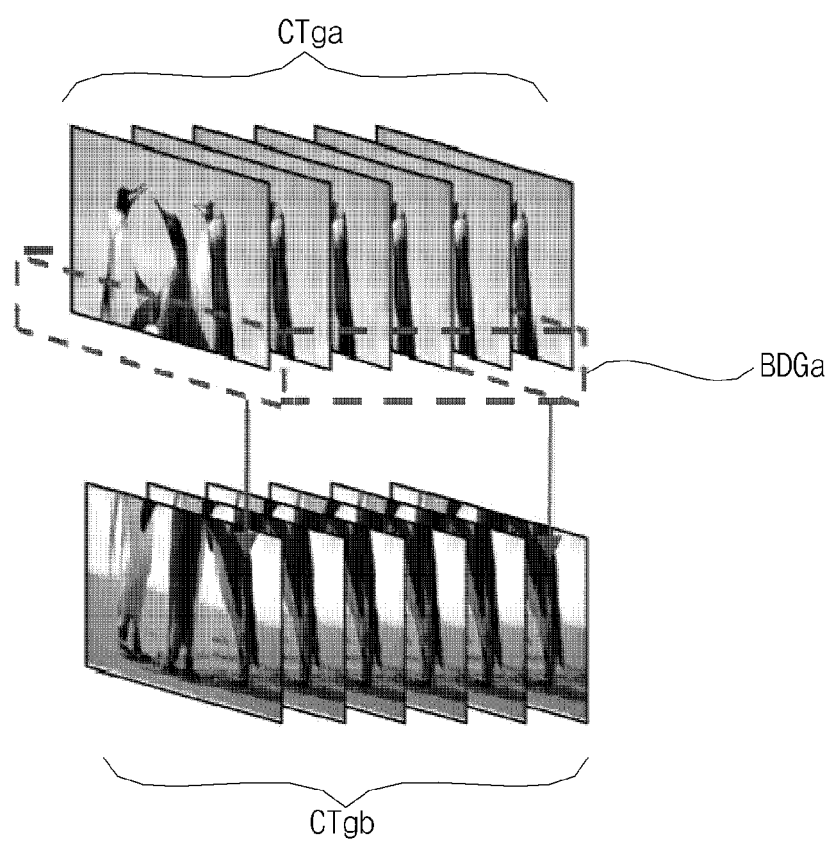

FIG. 19
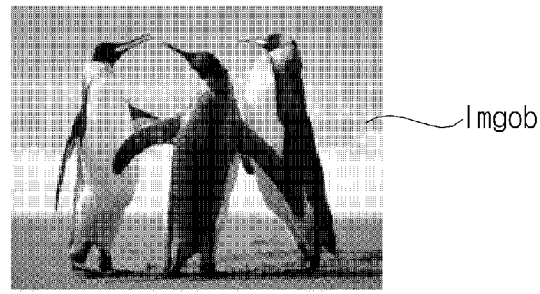
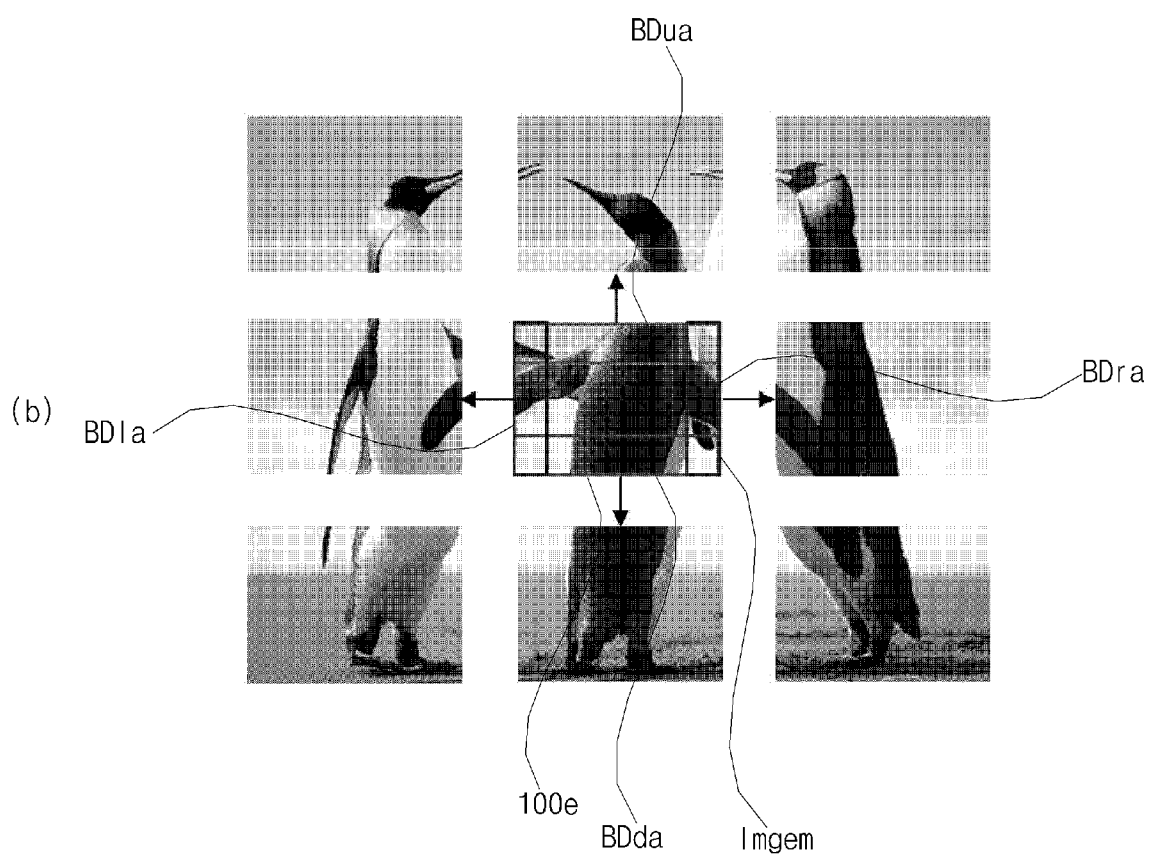

VIDEO WALL INCLUDING MULTIPLE DISPLAYS WITH REDUCED AFTERIMAGE

CROSS REFERENCE TO RELATED APPLICATIONS

This application is the National Phase of PCT International Application No. PCT/KR2020/000692, filed on Jan. 14, 2020, which claims priority under 35 U.S.C. 119(a) to Korean Patent Application No. 10-2019-0004400, filed in the Republic of Korea on Jan. 14, 2019, all of which are hereby expressly incorporated by reference into the present application.

BACKGROUND OF THE INVENTION

1. Field of the Invention

The present disclosure relates to a video wall, and more particularly to a video wall comprising a plurality of displays, in which an occurrence of black areas may be reduced while reducing afterimage.

2. Description of the Related Art

A video wall comprises a plurality of displays and is an image display device.

Generally, commercial video walls are used on the inside or outside of buildings for advertising purposes and the like.

Meanwhile, the displays used in the video wall may be of various types such as a liquid crystal display panel, organic light-emitting diode panel, and the like.

Meanwhile, in the case where the video wall comprises organic light-emitting diode panels, there may be a problem in that a burn-in phenomenon occurs due to an organic light-emitting material of each organic light-emitting diode panel.

SUMMARY OF THE INVENTION

It is an object of the present disclosure to provide a video wall comprising a plurality of displays, in which an occurrence of black areas may be reduced while reducing afterimage.

It is another object of the present disclosure to provide a video wall capable of reducing an afterimage while reducing the occurrence of black images, when a video is repeatedly displayed on the video wall.

It is yet another object of the present disclosure to provide a video wall comprising a plurality of displays, in which the service life of the video wall may be extended.

It is still another object of the present disclosure to provide a video wall capable of receiving black areas, which occur as an output position is shifted, from adjacent image display apparatuses, and processing the black areas.

In accordance with an aspect of the present disclosure, the above and other objects can be accomplished by providing a video wall comprising: a plurality of displays disposed adjacent to each other; an image divider configured to divide an input image into a plurality of images to be displayed on the plurality of displays; and at least one controller configured to control a plurality of image display apparatuses corresponding to the plurality of displays, wherein in response to a video displayed on the plurality of image display apparatuses being repeatedly played back, the controller is configured to store a boundary area displayed on the plurality of image display apparatuses and transmit the stored boundary area to adjacent image display apparatuses, and the respective image display apparatuses synthesize a received boundary area with an image area to be displayed, and display a portion of the synthesized image.

Meanwhile, the controller of a first image display apparatus, among the plurality of image display apparatuses, may determine whether the video displayed on the plurality of image display apparatuses is repeatedly played back, and in response to the video displayed on the plurality of image display apparatuses being repeatedly played back, may store the boundary area and may generate a synthetic image.

Meanwhile, in response to performing pixel shifting while the video displayed on the plurality of image display apparatuses is repeatedly played back, the controller of the first image display apparatus, among the plurality of image display apparatuses, may control direction information of the pixel shifting to be transmitted to the plurality of image display apparatuses.

Meanwhile, while the video displayed on the plurality of image display apparatuses is repeatedly played back, the controller of the first image display apparatus, among the plurality of image display apparatuses, may control pixel shifting to be performed collectively on the plurality of image display apparatuses.

Meanwhile, in response to performing shifting in a first direction at a first time point while the video displayed on the plurality of image display apparatuses is repeatedly played back: among the plurality of image display apparatuses, the first image display apparatus may transmit a first boundary area in the first direction, which is displayed on the first image display apparatus, to a second image display apparatus disposed adjacent to the first direction; and the second image display apparatus may synthesize an input image with the first boundary area to generate a synthetic image, and may display the synthetic image except for the boundary area in the first direction.

Meanwhile, in response to performing shifting in a second direction at a second time point after the first time point while the video displayed on the plurality of image display apparatuses is repeatedly played back: the first image display apparatus may transmit a second boundary area in the second direction, which is displayed on the first image display apparatus, to a third image display apparatus disposed adjacent to the second direction; and the third image display apparatus may synthesize an input image with the third boundary area to generate a synthetic image, and may display the synthetic image except for the boundary area in the third direction.

Meanwhile, while the video displayed on the plurality of image display apparatuses is repeatedly played back, the respective plurality of image display apparatuses may perform different pixel shifting operations, wherein the respective image display apparatuses may generate a synthesized area based on a boundary area of adjacent image display apparatuses and an input image, and may display an image of the synthesized area except for a boundary area in a pixel shifting direction.

Meanwhile, while the video displayed on the plurality of image display apparatuses is repeatedly played back when the second image display apparatus is disposed in the first direction of the first image display apparatus and the third image display apparatus is disposed in the second direction, among the plurality of image display apparatuses, if, at the first time point, shifting in the first direction is performed by the second image display apparatus and shifting in the third direction is performed by the third image display apparatus: the second image display apparatus may synthesize an input image with the first boundary area in the first direction, which is displayed on the first image display apparatus, to generate a synthetic image, and may display the synthetic image except for the boundary area in the first direction; and the third image display apparatus may synthesize an input image with the second boundary area in the second direction, which is displayed on the first image display apparatus, to generate a synthetic image, and may display the synthetic image except for the boundary area in the second direction.

Meanwhile, while the video displayed on the plurality of image display apparatuses is repeatedly played back, a movement amount of pixel shift may vary at each scene change.

Meanwhile, as the movement amount of pixel shift changes at each scene change, a size of the boundary area may vary and may be transmitted.

Meanwhile, while the video displayed on the plurality of image display apparatuses is repeatedly played back, an image of the boundary area may be transmitted sequentially to adjacent image display apparatuses.

Meanwhile, the plurality of image display apparatuses may comprise an organic light emitting diode panel.

In accordance with another aspect of the present disclosure, the above and other objects can be accomplished by providing a video wall comprising: a plurality of displays disposed adjacent to each other; an image divider configured to divide an input image into a plurality of images to be displayed on the plurality of displays; and at least one controller configured to control a plurality of image display apparatuses corresponding to the plurality of displays, wherein in response to a video displayed on the plurality of image display apparatuses being repeatedly played back, a first boundary image in a first image, which is input to a first image display apparatus among the plurality of image display apparatuses, is synthesized with a second image which is input to the second image display apparatus disposed adjacent to the first image display apparatus, and a portion of the synthesized image is displayed on the second image display apparatus.

Meanwhile, a controller of the first image display apparatus may determine whether the video displayed on the plurality of image display apparatuses is repeatedly played back, and in response to the video displayed on the plurality of image display apparatuses being repeatedly played back, may control the first boundary image in the first image, which is input to the first image display apparatus among the plurality of image display apparatuses, to be transmitted to the second image display apparatus.

Meanwhile, a controller of the second image display apparatus may synthesize the first boundary image received from the first image display apparatus with a second input image, and may control a portion of the synthesized image to be displayed on a display of the second image display apparatus.

Effects of the Invention

A video wall according to an embodiment of the present disclosure comprises: a plurality of displays disposed adjacent to each other; an image divider configured to divide an input image into a plurality of images to be displayed on the plurality of displays; and at least one controller configured to control a plurality of image display apparatuses corresponding to the plurality of displays, wherein in response to a video displayed on the plurality of image display apparatuses being repeatedly played back, the controller is configured to store a boundary area displayed on the plurality of image display apparatuses and transmit the stored boundary area to adjacent image display apparatuses, and the respective image display apparatuses synthesize a received boundary area with an image area to be displayed, and display a portion of the synthesized image. Accordingly, an occurrence of black areas may be reduced while reducing afterimage on the video wall. Particularly, the occurrence of black areas may be reduced while reducing the afterimage on the video wall, on which the video is repeatedly displayed.

Meanwhile, the controller of a first image display apparatus, among the plurality of image display apparatuses, may determine whether the video displayed on the plurality of image display apparatuses is repeatedly played back, and in response to the video displayed on the plurality of image display apparatuses being repeatedly played back, may store the boundary area and may generate a synthetic image. Accordingly, the occurrence of black areas may be reduced while reducing the afterimage on the video wall, on which the video is repeatedly displayed.

Meanwhile, in response to performing pixel shifting while the video displayed on the plurality of image display apparatuses is repeatedly played back, the controller of the first image display apparatus, among the plurality of image display apparatuses, may control direction information of the pixel shifting to be transmitted to the plurality of image display apparatuses. Accordingly, the occurrence of black areas may be reduced while reducing the afterimage on the video wall, on which the video is repeatedly displayed.

Meanwhile, while the video displayed on the plurality of image display apparatuses is repeatedly played back, the controller of the first image display apparatus, among the plurality of image display apparatuses, may control pixel shifting to be performed collectively on the plurality of image display apparatuses. Accordingly, the occurrence of black areas may be reduced while reducing the afterimage on the video wall, on which the video is repeatedly displayed.

Meanwhile, in response to performing shifting in a first direction at a first time point while the video displayed on the plurality of image display apparatuses is repeatedly played back: among the plurality of image display apparatuses, the first image display apparatus may transmit a first boundary area in the first direction, which is displayed on the first image display apparatus, to a second image display apparatus disposed adjacent to the first direction; and the second image display apparatus may synthesize an input image with the first boundary area to generate a synthetic image, and may display the synthetic image except for the boundary area in the first direction. Accordingly, the occurrence of black areas may be reduced while reducing the afterimage on the video wall.

Meanwhile, in response to performing shifting in a second direction at a second time point after the first time point while the video displayed on the plurality of image display apparatuses is repeatedly played back: the first image display apparatus may transmit a second boundary area in the second direction, which is displayed on the first image display apparatus, to a third image display apparatus disposed adjacent to the second direction; and the third image display apparatus may synthesize an input image with the third boundary area to generate a synthetic image, and may display the synthetic image except for the boundary area in the third direction. Accordingly, the occurrence of black areas may be reduced while reducing the afterimage on the video wall, on which the video is repeatedly displayed.

Meanwhile, while the video displayed on the plurality of image display apparatuses is repeatedly played back, the respective plurality of image display apparatuses may perform different pixel shifting operations, wherein the respective image display apparatuses may generate a synthesized area based on a boundary area of adjacent image display apparatuses and an input image, and may display an image of the synthesized area except for a boundary area in a pixel shifting direction. Accordingly, the occurrence of black areas may be reduced while reducing the afterimage on the video wall, on which the video is repeatedly displayed.

Meanwhile, while the video displayed on the plurality of image display apparatuses is repeatedly played back when the second image display apparatus is disposed in the first direction of the first image display apparatus and the third image display apparatus is disposed in the second direction, among the plurality of image display apparatuses, if, at the first time point, shifting in the first direction is performed by the second image display apparatus and shifting in the third direction is performed by the third image display apparatus: the second image display apparatus may synthesize an input image with the first boundary area in the first direction, which is displayed on the first image display apparatus, to generate a synthetic image, and may display the synthetic image except for the boundary area in the first direction; and the third image display apparatus may synthesize an input image with the second boundary area in the second direction, which is displayed on the first image display apparatus, to generate a synthetic image, and may display the synthetic image except for the boundary area in the second direction. Accordingly, the occurrence of black areas may be reduced while reducing the afterimage on the video wall, on which the video is repeatedly displayed.

Meanwhile, while the video displayed on the plurality of image display apparatuses is repeatedly played back, a movement amount of pixel shift may vary at each scene change. Accordingly, the occurrence of black areas may be reduced while reducing the afterimage on the video wall, on which the video is repeatedly displayed.

Meanwhile, as the movement amount of pixel shift changes at each scene change, a size of the boundary area may vary and may be transmitted. Accordingly, the occurrence of black areas may be reduced while reducing the afterimage on the video wall, on which the video is repeatedly displayed.

Meanwhile, while the video displayed on the plurality of image display apparatuses is repeatedly played back, an image of the boundary area may be transmitted sequentially to adjacent image display apparatuses. Accordingly, the occurrence of black areas may be reduced while reducing the afterimage on the video wall, on which the video is repeatedly displayed.

Meanwhile, a video wall according to another embodiment of the present disclosure comprises: a plurality of displays disposed adjacent to each other; an image divider configured to divide an input image into a plurality of images to be displayed on the plurality of displays; and at least one controller configured to control a plurality of image display apparatuses corresponding to the plurality of displays, wherein in response to a video displayed on the plurality of image display apparatuses being repeatedly played back, a first boundary image in a first image, which is input to a first image display apparatus among the plurality of image display apparatuses, is synthesized with a second image which is input to the second image display apparatus disposed adjacent to the first image display apparatus, and a portion of the synthesized image is displayed on the second image display apparatus. Accordingly, the occurrence of black areas may be reduced while reducing the afterimage on the video wall, on which the video is repeatedly displayed.

Meanwhile, a controller of the first image display apparatus may determine whether the video displayed on the plurality of image display apparatuses is repeatedly played back, and in response to the video displayed on the plurality of image display apparatuses being repeatedly played back, may control the first boundary image in the first image, which is input to the first image display apparatus among the plurality of image display apparatuses, to be transmitted to the second image display apparatus. Accordingly, the occurrence of black areas may be reduced while reducing the afterimage on the video wall, on which the video is repeatedly displayed.

Meanwhile, a controller of the second image display apparatus may synthesize the first boundary image received from the first image display apparatus with a second input image, and may control a portion of the synthesized image to be displayed on a display of the second image display apparatus. Accordingly, the occurrence of black areas may be reduced while reducing the afterimage on the video wall, on which the video is repeatedly displayed.

BRIEF DESCRIPTION OF THE DRAWINGS

FIG. 11 is a flowchart illustrating an operating method of a video wall according to an embodiment of the present disclosure; and FIGS. 12A to 19 are diagrams referred to in the description of operation of FIG. 11.

DETAILED DESCRIPTION OF THE PREFERRED EMBODIMENTS

Hereinafter, the present disclosure will be described in detail with reference to the accompanying drawings.

The suffixes "module" and "unit" in elements used in description below are given only in consideration of ease in preparation of the specification and do not have specific meanings or functions. Therefore, the suffixes "module" and "unit" may be used interchangeably.

Figure 1:
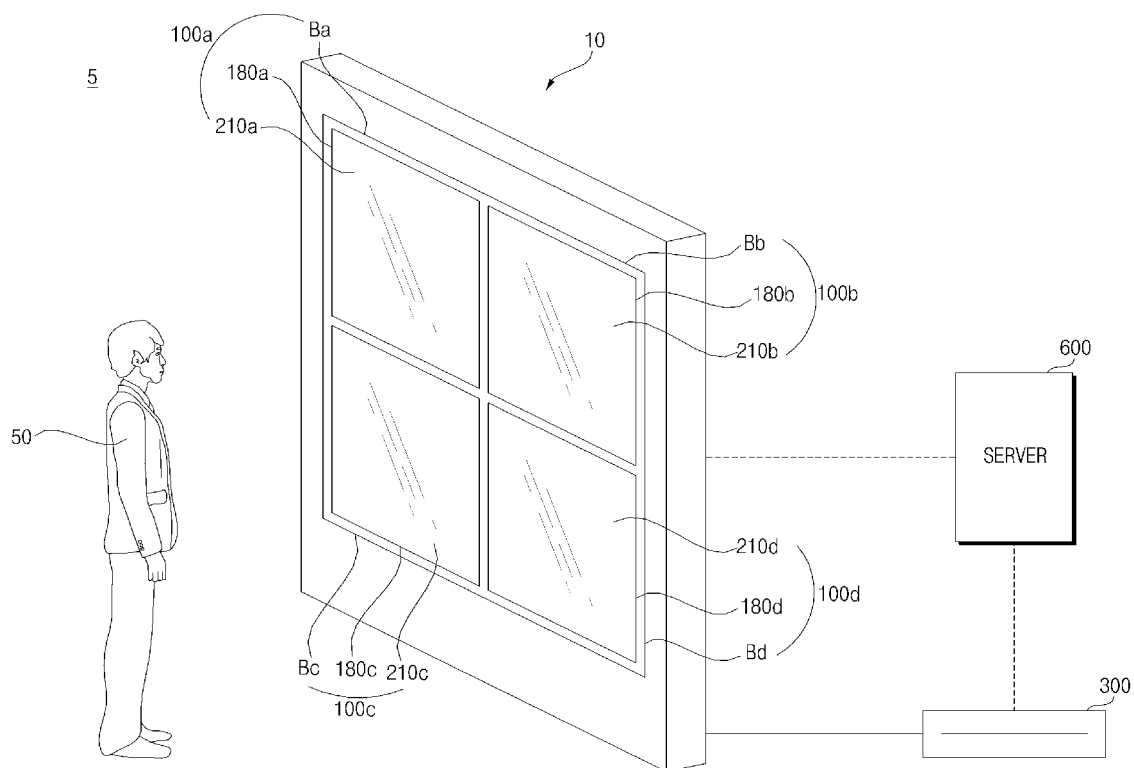
FIG. 1 is a diagram illustrating an image display system according to an embodiment of the present disclosure.

FIG. 1 is a diagram illustrating an image display system according to an embodiment of the present disclosure.

Referring to the drawing, the image display system 5 according to an embodiment of the present disclosure may comprise a video wall 10 comprising a plurality of image display apparatuses 100*a* to 100*d*, a set-top box 300, and a server 600.

The video wall 10 according to an embodiment of the present disclosure may receives images from the set-top box 300, the server 600, an internal memory, or the like.

For example, the video wall 10 may receive an image signal from the set-top box 300 through an HDMI terminal.

In another example, the video wall 10 may receive an image signal from the server 600 through a network terminal.

Meanwhile, the video wall 10 may be installed inside a building or may be installed outdoors in public places.

For example, the video wall 10 may be provided in public places such as vehicles, bus terminals, railroad stations and airports, in order to provide information such as advertisements, news and notices. In addition, the display apparatus may be provided near display windows of department stores, shopping malls or markets, for advertisements of specific products.

The video wall 10 may comprise a plurality of displays 180*a* to 180*d* arranged contiguously.

Meanwhile, a plurality of displays 180*a* to 180*d* may be implemented with any one of various panels. For example, the plurality of displays 180*a* to 180*d* may be any one of a liquid crystal display (LCD) panel, an organic light emitting diode (OLED) panel, an inorganic light emitting diode (LED) panel, and the like.

The following description will be made based on an example in which the plurality of displays 180*a* to 180*d* comprise the organic light emitting diode (OLED) panel.

Meanwhile, the organic light emitting diode (OLED) panel has advantages in that the OLED panel has a faster response speed than that of LCD, has an excellent color representation effect with high color representation qualities.

Meanwhile, the plurality of displays 180*a* to 180*d* may comprise a plurality of panels 210*a* to 210*d* and bezels Ba to Bd surrounding the panels 210*a* to 210*d*, respectively.

In the figure, the video wall 10 comprises a plurality of image display apparatuses 100*a* to 100*d* comprising the plurality of displays 180*a* to 180*d*. The plurality of image display apparatuses 100*a* to 100*d* may comprise a plurality of controllers 170*a* to 170*d* in addition to the plurality of displays 180*a* to 180*d*.

For example, in the video wall 10, images divided by an image divider 160 may be input to the controllers 170*a* to 170*d* respectively comprised in the plurality of image display apparatuses 100*a* to 100*d* and the image signals respectively processed by the controllers 170*a* to 170*d* may be input to the displays 180*a* to 180*d*. The displays 180*a* to 180*d* may display the images.

Accordingly, a viewer 50 can view the images displayed through the video wall 10 as shown in the figure. In particular, the viewer can view the images displayed through the plurality of displays 180*a* to 180*d*.

In another example, the video wall 10 may comprise one controller for commonly controlling the plurality of image display apparatuses 100*a* to 100*d*. The common controller may perform signal processing on the displayed image. The processed images may be input to the displays 180*a* to 180*d* and the respective displays 180*a* to 180*d* may display the images.

Meanwhile, in the case where the plurality of displays 180*a* to 180*d* comprise the OLED panel, an afterimage may be caused by the burn-in phenomenon due to the characteristics of the OLED panel.

Particularly, if an image with high brightness is displayed continuously at the same position, a device service life at the corresponding position is reduced.

As technology for preventing an afterimage caused by the burn-in phenomenon, there is technology for shifting an output position so as to prevent the same position from burning in continuously, technology for preventing burn-in by gradually decreasing the brightness of a still image, and the like.

The technology for shifting the output position to prevent the same position from burning in continuously is a very useful and widely used technology for reducing an afterimage in a single image display apparatus, but it is not easy to apply the technology to the video wall.

Specifically, if the output position is shifted in the video wall, in which one image is divided into several images to be output, there may be a problem in that back bars occur in the middle of the image, such that it is not easy to apply the technology.

Accordingly, the present disclosure provides a method of reducing the occurrence of black areas while reducing an afterimage.

The video wall 10 according to an embodiment of the present disclosure comprises: a plurality of displays 180*a* to 180*d* disposed adjacent to each other; an image divider 160 configured to divide an input image into a plurality of images to be displayed on the plurality of displays 180*a* to 180*d*; and at least one controller 170 for controlling the plurality of image display apparatuses 100*a* to 100*d* corresponding to the plurality of displays 180*a* to 180*d*, wherein if a video displayed on the plurality of image display apparatuses 100*a* to 100*d* is repeatedly played back, a boundary area displayed on the plurality of image display apparatuses 100*a* to 100*d* is stored and transmitted to adjacent image display apparatuses, and each image display apparatus synthesizes the received boundary area with an image area to be displayed, and displays a portion of the synthesized image. Accordingly, an occurrence of black areas may be reduced while reducing afterimage on the video wall 10. Particularly, the occurrence of black areas may be reduced while reducing the afterimage on the video wall 10, on which the video is repeatedly displayed.

Meanwhile, a controller 170*a* of the first image display apparatus 100*a* for controlling a first display 180*a*, among the plurality of image display apparatuses 100*a* to 100*d*, determines whether a video displayed on the plurality of image display apparatuses 100*a* to 100*d* is repeatedly played back, and if a video displayed on the plurality of image display apparatuses 100*a* to 100*d* is repeatedly played back, may store a boundary area and generate a synthetic image. Accordingly, the occurrence of black areas may be reduced while reducing the afterimage on the video wall 10, on which the video is repeatedly displayed.

A video wall 10 according to another embodiment of the present disclosure comprises: a plurality of displays 180*a* to 180*d* disposed adjacent to each other; an image divider 160 configured to divide an input image into a plurality of images to be displayed on the plurality of displays 180*a* to 180*d*; and at least one controller 170 for controlling the plurality of image display apparatuses 100*a* to 100*d* corresponding to the plurality of displays 180*a* to 180*d*, wherein if a video displayed on the plurality of image display apparatuses 100*a* to 100*d* is repeatedly played back, a first boundary image in a first image, which is input to a first image display apparatus 100*a* among the plurality of image display apparatuses 100*a* to 100*d*, is synthesized with a second image which is input to a second display apparatus 100b disposed adjacent to the first image display apparatuses 100a, and a portion of the synthesized image may be displayed on the second image display apparatus 100b. Accordingly, an occurrence of black areas may be reduced while reducing afterimage on the video wall 10. Particularly, the occurrence of black areas may be reduced while reducing the afterimage on the video wall 10, on which the video is repeatedly displayed.

Meanwhile, a structure and operation of the video wall 10 and the like will be described in further detail with reference to FIGS. 2 and 3.

Figure 2:
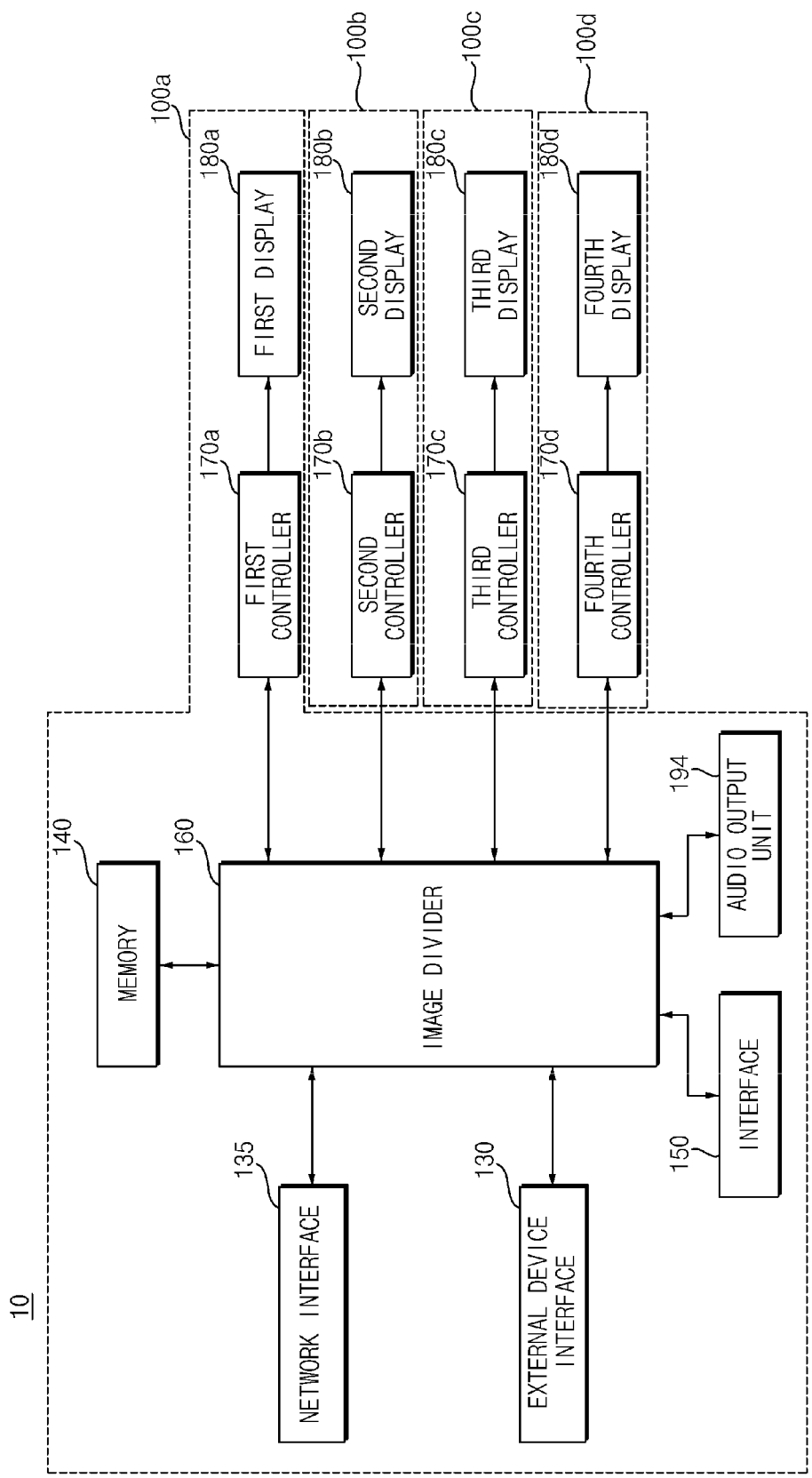
FIG. 2 is an example of an internal block diagram of a video wall of FIG. 1.

FIG. 2 is an example of an internal block diagram of a video wall of FIG. 1.

Referring to the drawing, the video wall 10 may comprise a first to fourth image display apparatuses 100a to 100d.

In the drawing, an example is illustrated in which the second to fourth image display apparatuses 100b to 100d have a second to fourth displays 180b to 180d, respectively, or a second to fourth controllers 170b to 170d, respectively, but may comprise an external device interface, a network interface, a memory, an image divider, a power supply, an audio output device 194, etc., unlike the drawing.

Meanwhile, the first image display apparatus 100a may comprise an external device interface 130, a network interface 135, a memory 140, a user input interface 150, an image divider 160, a first controller 170a, a first display 180a, a power supply 190, an audio output device 194, and the like.

The external device interface 130 may serve to transmit or receive data to or from an external device (not shown) connected thereto. The external device interface 130 may comprise an A/V input/output (I/O) device (not shown) or a data input/output module (not shown).

For example, the external device interface 130 may comprise an HDMI port, an RGB port, a component port, a USB port, a micro SD port, etc.

The network interface 135 serves as an interface between the image video wall 100 and a wired/wireless network such as the Internet. For example, the network interface 135 may receive content or data provided by an Internet or content provider or a network operator over a network.

The memory 140 may store various programs necessary for the controller 170 to process and control signals, and may also store processed video, audio and data signals.

Further, the memory 140 may temporarily store a video, audio and/or data signal received from the external device interface 130.

Meanwhile, the plurality of displays 180a to 180d may be contiguously arranged, may comprise various display panels such as LCDs, OLEDs, PDPs, etc., and may display predetermined images through the display panels.

The user input interface 150 transmits a signal input by the user to the controller 170 or transmits a signal received from the controller 170 to the user.

To this end, the user input interface 150 may comprise a local key comprising a power key, a touch panel for inputting user information, etc.

The image divider 160 may divide an input image stored in the memory 140 or an input image received from an external device through the external device interface 130 or the network interface 135 into a plurality of images, for displaying the input image through the plurality of displays 180a to 180d.

For example, the image divider 160 may crop the input image into a plurality of images and scale the images.

In particular, the image divider 160 may perform cropping and scaling in consideration of the resolution and size of the plurality of displays 180a to 180d.

Meanwhile, the image divider 160 may perform overall control of the video wall 10, and, more particularly, control operation of the units of the video wall 10.

Meanwhile, at least one controller may be provided in order to control the plurality of displays 180a to 180d.

Meanwhile, in the figure, the plurality of controllers 170a to 170d corresponding to the plurality of displays 180a to 180d is shown, in order to control the plurality of displays 180a to 180d.

The plurality of controllers 170a to 170d may perform control operation for image display through the plurality of displays 180a to 180d.

Meanwhile, if a video displayed on the plurality of image display apparatuses 100a to 100d is repeatedly played back, each of the plurality of controller 170a to 170d may store a boundary area displayed on the plurality of image display apparatuses 100a to 100d and may transmit the stored boundary area to adjacent image display apparatuses, and each of the image display apparatuses 100a to 100d may synthesize the received boundary area with an image area to be displayed, and may display a portion of the synthesized image. Accordingly, an occurrence of black areas may be reduced while reducing afterimage on the video wall 10. Particularly, the occurrence of black areas may be reduced while reducing the afterimage on the video wall 10, on which the video is repeatedly displayed.

Meanwhile, the controller 170a of the first image display apparatus 100a, among the plurality of image display apparatuses 100a to 100d, determines whether a video displayed on the plurality of image display apparatuses 100a to 100d is repeatedly played back, and if a video displayed on the plurality of image display apparatuses 100a to 100d is repeatedly played back, may store a boundary area and generate a synthetic image. Accordingly, an occurrence of black areas may be reduced while reducing afterimage on the video wall 10, on which the video is repeatedly displayed.

Meanwhile, in response to performing pixel shifting while a video displayed on the plurality of image display apparatuses 100a to 100d is repeatedly played back, the controller 170a of the first image display apparatus 100a, among the plurality of image display apparatuses 100a to 100d, may transmit direction information of the pixel shifting to the plurality of image display apparatuses 100a to 100d. Accordingly, an occurrence of black areas may be reduced while reducing afterimage on the video wall 10, on which the video is repeatedly displayed.

Meanwhile, while a video displayed on the plurality of image display apparatuses 100a to 100d is repeatedly played back, the controller 170a of the first image display apparatus 100a, among the plurality of image display apparatuses 100a to 100d, may control pixel shifting to be performed collectively on the plurality of image display apparatuses 100a to 100d. Accordingly, an occurrence of black areas may be reduced while reducing afterimage on the video wall 10, on which the video is repeatedly displayed.

Meanwhile, each of the plurality of controllers 170a to 170d may control the plurality of displays 180a to 180d to output a predetermined image. More specifically, RGB signals corresponding to a video image to be displayed may be output through the plurality of displays 180a to 180d. Thus, the plurality of displays 180a to 180d may display respective images.

The power supply 190 may receive external or internal power and supply power necessary for operation of the components.

The power supply 190 supplies power to the image video wall 100 and, more particularly, the plurality of controllers 170a to 170d implemented in the form of a system on chip (SOC), the plurality of displays 180a to 180d for displaying video, and the audio output device 194 for outputting audio.

A temperature sensor (not shown) may sense the temperature of the video wall 10.

The temperature sensed by the temperature sensor (not shown) may be input to the plurality of controllers 170a to 170d or the image divider 160, which may control operation of a fan driver (not shown) in order to reduce internal heat based on the sensed temperature.

Figure 3:
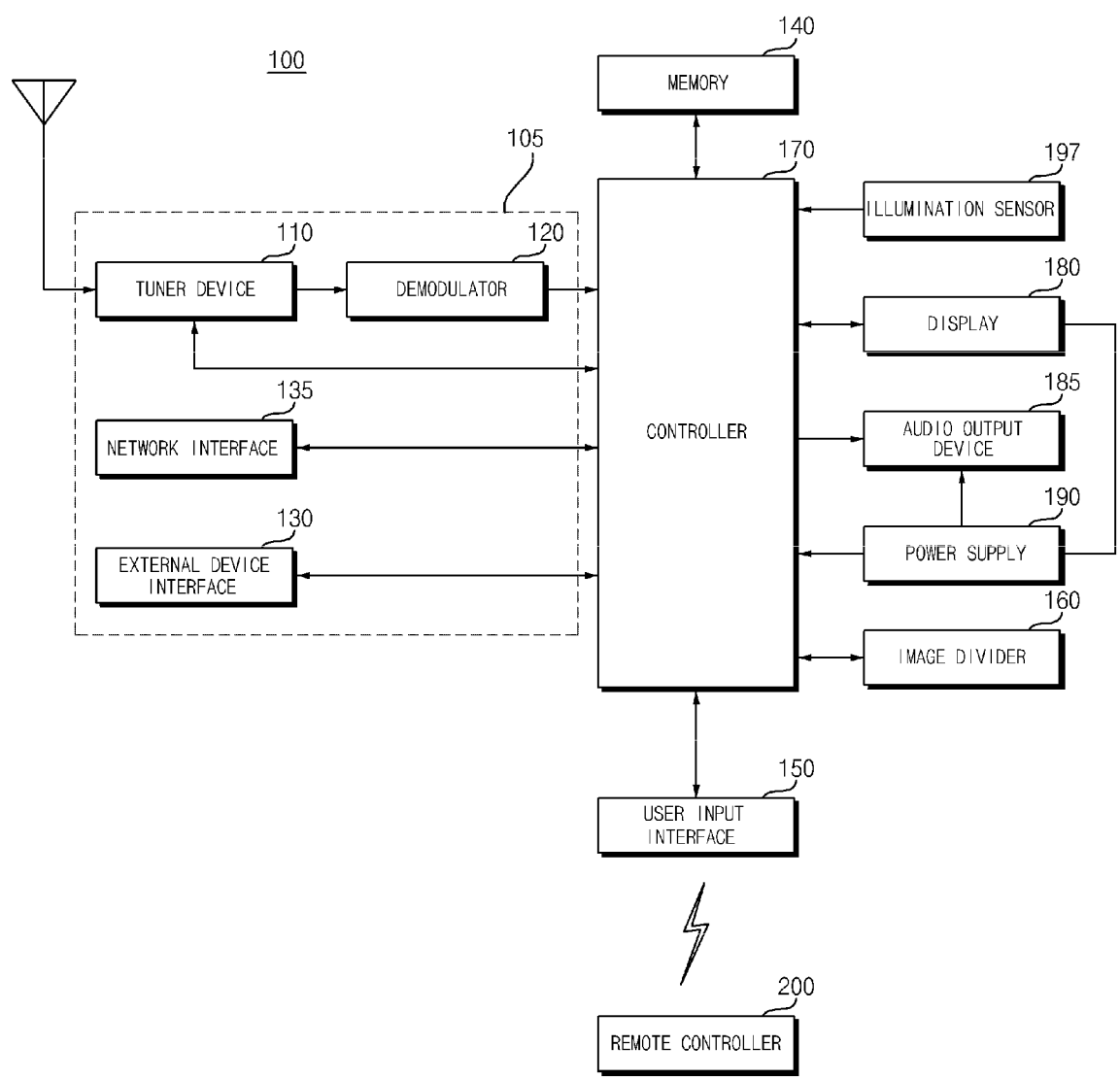
FIG. 3 is an example of an internal block diagram of an image display apparatus of FIG. 1.

FIG. 3 is an example of an internal block diagram of an image display apparatus of FIG. 1.

Referring to FIG. 3, the image display apparatus 100 according to an embodiment of the present disclosure comprises an image receiver 105, a memory 140, a user input interface 150, a sensor device (not shown), a controller 170, a display 180, and an audio output device 185.

The image receiver 105 may comprise a tuner device 110, a demodulator 120, a network interface 135, and an external device interface 130.

Meanwhile, unlike the drawing, the image receiver 105 may comprise only the tuner device 110, the demodulator 120, and the external device interface 130. That is, the network interface 135 may not be comprised.

The tuner device 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner device 110 can process a digital broadcast signal or an analog broadcast signal. The analog baseband image or audio signal (CVBS/SIF) output from the tuner device 110 may be directly input to the controller 170.

Meanwhile, the tuner device 110 can comprise a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner device 110 and performs a demodulation operation.

The demodulator 120 may perform demodulation and channel decoding and then output a stream signal TS. At this time, the stream signal may be a demultiplexed signal of an image signal, an audio signal, or a data signal.

The stream signal output from the demodulator 120 may be input to the controller 170. The controller 170 performs demultiplexing, image/audio signal processing, and the like, and then outputs an image to the display 180 and outputs audio to the audio output device 185.

The external device interface 130 may transmit or receive data with a connected external apparatus (not shown), e.g., a set-top box 50. To this end, the external device interface 130 may comprise an A/V input and output device (not shown).

The external device interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output device may receive image and audio signals from an external apparatus. Meanwhile, a wireless communication device (not shown) may perform short-range wireless communication with other electronic apparatus.

Through the wireless communication device (not shown), the external device interface 130 may exchange data with an adjacent mobile terminal 600. In particular, in a mirroring mode, the external device interface 130 may receive device information, executed application information, application image, and the like from the mobile terminal 600.

The network interface 135 provides an interface for connecting the image display apparatus 100 to a wired/wireless network comprising the Internet network. For example, the network interface 135 may receive, via the network, content or data provided by the Internet, a content provider, or a network operator.

Meanwhile, the network interface 135 may comprise a wireless communication device (not shown).

The memory 140 may store a program for each signal processing and control in the controller 170, and may store a signal-processed image, audio, or data signal.

In addition, the memory 140 may serve to temporarily store image, audio, or data signal input to the external device interface 130. In addition, the memory 140 may store information on a certain broadcast channel through a channel memory function such as a channel map.

Although FIG. 3 illustrates that the memory 140 is provided separately from the controller 170, the scope of the present invention is not limited thereto. The memory 140 may be comprised in the controller 170.

The user input interface 150 transmits a signal input by the user to the controller 170 or transmits a signal from the controller 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the controller 170, may transfer a user input signal input from a sensor device (not shown) that senses a user's gesture to the controller 170, or may transmit a signal from the controller 170 to the sensor device (not shown).

The controller 170 may demultiplex the input stream through the tuner device 110, the demodulator 120, the network interface 135, or the external device interface 130, or process the demultiplexed signals to generate and output a signal for image or audio output.

For example, the controller 170 receives a broadcast signal received by the image receiver 105 or an HDMI signal, and perform signal processing based on the received broadcast signal or the HDMI signal to thereby output a signal-processed image signal.

The image signal processed by the controller 170 is input to the display 180, and may be displayed as an image corresponding to the image signal. In addition, the image signal processed by the controller 170 may be input to the external output apparatus through the external device interface 130.

The audio signal processed by the controller 170 may be output to the audio output device 185 as an audio signal. In addition, audio signal processed by the controller 170 may be input to the external output apparatus through the external device interface 130.

Although not shown in FIG. 3, the controller 170 may comprise a demultiplexer, an image processor, and the like. That is, the controller 170 may perform a variety of signal processing and thus it may be implemented in the form of a system on chip (SOC). This will be described later with reference to FIG. 4.

In addition, the controller 170 can control the overall operation of the image display apparatus 100. For example, the controller 170 may control the tuner device 110 to control the tuning of the RF broadcast corresponding to the channel selected by the user or the previously stored channel.

In addition, the controller 170 may control the image display apparatus 100 according to a user command input through the user input interface 150 or an internal program.

Meanwhile, the controller 170 may control the display 180 to display an image. At this time, the image displayed on the display 180 may be a still image or a moving image, and may be a 2D image or a 3D image.

Meanwhile, the controller 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the controller 170 may recognize the position of the user based on the image photographed by a photographing device (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the controller 170, an image signal, a data signal, a control signal, and the like received from the external device interface 130.

Meanwhile, the display 180 may be configured as a touch screen and used as an input device in addition to an output device.

The audio output device 185 receives a signal processed by the controller 170 and outputs it as an audio.

The photographing device (not shown) photographs a user. The photographing device (not shown) may be implemented by a single camera, but the present invention is not limited thereto and may be implemented by a plurality of cameras. Image information photographed by the photographing device (not shown) may be input to the controller 170.

The controller 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output device 185 for outputting an audio.

Specifically, the power supply 190 may comprise a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 3 is a block diagram for an embodiment of the present invention. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present invention, and specific operation and apparatus do not limit the scope of the present invention.

Figure 4:
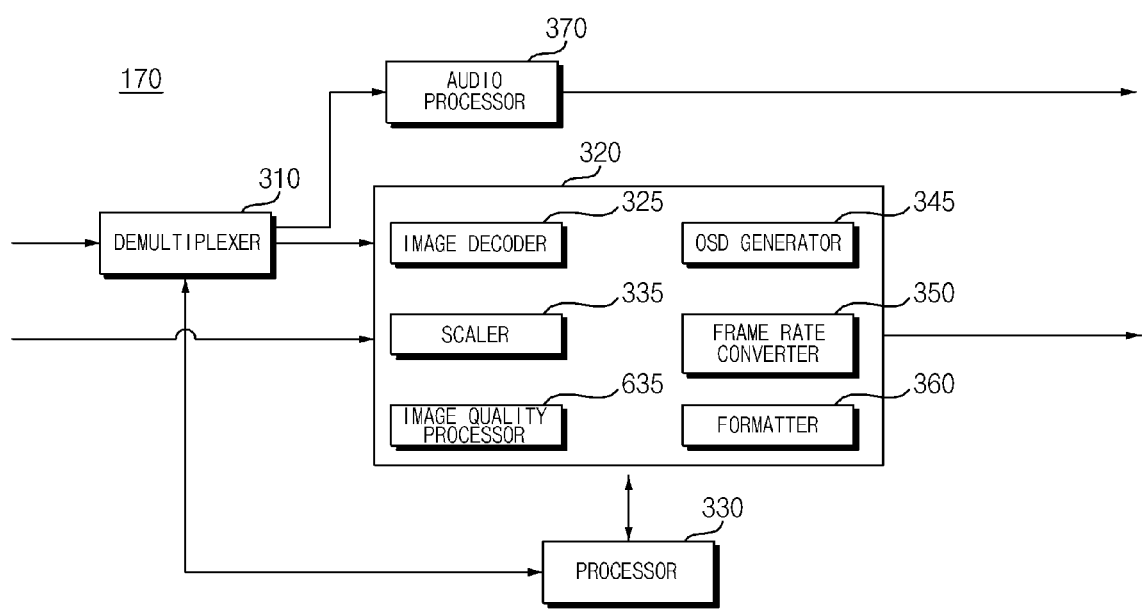
FIG. 4 is an example of an internal block diagram of a controller of FIG. 3.

FIG. 4 is an example of an internal block diagram of a controller of FIG. 3.

Referring to the drawing, the controller 170 according to an embodiment of the present invention may comprise a demultiplexer 310, an image processor 320, a processor 330, and an audio processor 370. In addition, the controller 170 may further comprise and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner device 110, the demodulator 120, or the external device interface 130.

The image processor 320 may perform signal processing on an input image. For example, the image processor 320 may perform image processing on an image signal demultiplexed by the demultiplexer 310.

To this end, the image processor 320 may comprise an image decoder 325, a scaler 335, an image quality processor 635, an image encoder (not shown), an OSD generator 340, a frame rate converter 350, a formatter 360, etc.

The image decoder 325 decodes a demultiplexed image signal, and the scaler 335 performs scaling so that the resolution of the decoded image signal can be output from the display 180.

The image decoder 325 can comprise a decoder of various standards. For example, a 3D image decoder for MPEG-2, H.264 decoder, a color image, and a depth image, and a decoder for a plurality of view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 625 may perform noise reduction processing on an input image signal, extend a resolution of high gray level of the input image signal, perform image resolution enhancement, perform high dynamic range (HDR)-based signal processing, change a frame rate, perform image quality processing appropriate for properties of a panel, especially an OLED panel, etc.

The OSD generator 340 generates an OSD signal according to a user input or by itself. For example, based on a user input signal, the OSD generator 340 may generate a signal for displaying various information as a graphic or a text on the screen of the display 180. The generated OSD signal may comprise various data such as a user interface screen of the image display apparatus 100, various menu screens, a widget, and an icon. In addition, the generated OSD signal may comprise a 2D object or a 3D object.

In addition, the OSD generator 340 may generate a pointer that can be displayed on the display, based on a pointing signal input from the remote controller 200. In particular, such a pointer may be generated by a pointing controller, and the OSD generator 240 may comprise the pointing controller (not shown). Obviously, the pointing controller (not shown) may be provided separately from the OSD generator 240.

The Frame Rate Converter (FRC) 350 may convert a frame rate of the input image. The frame rate converter 350 may output the image as it is without separate frame rate conversion.

Meanwhile, the formatter 360 may change a format of an input image signal into a format suitable for displaying the image signal on a display and output the image signal in the changed format.

In particular, the formatter 360 may change a format of an image signal to correspond to a display panel.

The processor 330 may control overall operations of the image display apparatus 100 or the controller 170.

For example, the processor 330 may control the tuner device 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external device interface 130.

In addition, the processor 330 may control the demultiplexer 310, the image processor 320, and the like in the controller 170.

Meanwhile, the audio processor 370 in the controller 170 may perform the audio processing of the demultiplexed audio signal. To this end, the audio processor 370 may comprise various decoders.

In addition, the audio processor 370 in the controller 170 may process a base, a treble, a volume control, and the like.

The data processor (not shown) in the controller 170 may perform data processing of the demultiplexed data signal. For example, when the demultiplexed data signal is a coded data signal, it can be decoded. The encoded data signal may be electronic program guide information comprising broadcast information such as a start time and an end time of a broadcast program broadcasted on each channel.

Meanwhile, a block diagram of the controller 170 shown in FIG. 4 is a block diagram for an embodiment of the present invention. Each component of the block diagram may be integrated, added, or omitted according to a specification of the controller 170 actually implemented.

In particular, the frame rate converter 350 and the formatter 360 may be provided separately in addition to the image processor 320.

Figure 5:
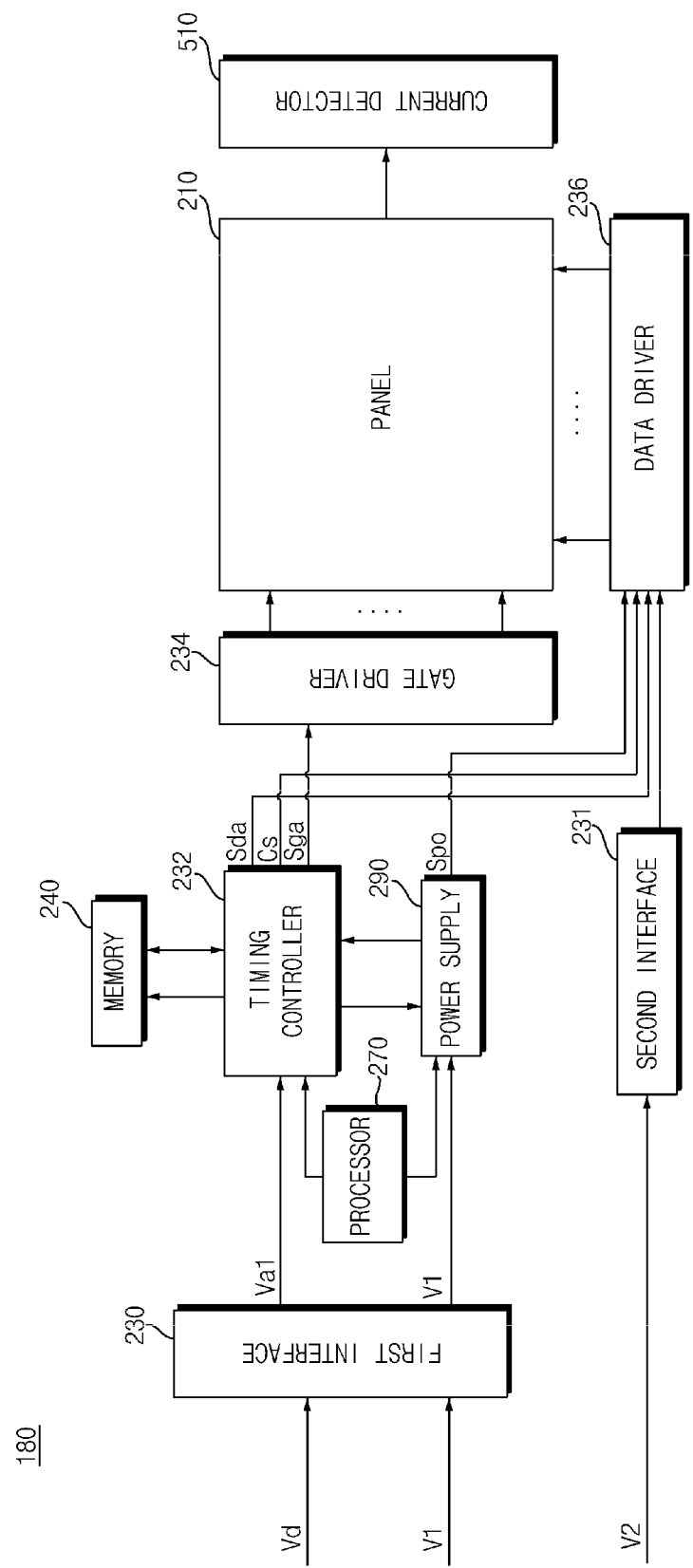
FIG. 5 is an internal block diagram of a display of FIG. 3.

FIG. 5 is an internal block diagram of a display of FIG. 3.

Referring to the drawing, the organic light emitting diode panel-based display 180 may comprise an organic light emitting diode panel 210, a first interface 230, a second interface 231, a timing controller 232, a gate driver 234, a data driver 236, a memory 240, a processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the controller 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the controller 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

At this time, when the panel 210 comprises a RGBW subpixel, the data driving signal Sda may be a data driving signal for driving of RGBW subpixel.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may comprise an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 510 may detect the current flowing in a sub-pixel of the organic light emitting diode panel 210. The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in a sub-pixel of the organic light emitting diode panel 210 from the current detector 510.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or higher than 300000 A, the processor 270 may determine that a corresponding subpixel is a burn-in subpixel.

Meanwhile, if the accumulated current of each subpixel of the OLED panel 210 is close to an allowable value, the processor 270 may determine that a corresponding subpixel is a subpixel expected to be burn in.

Meanwhile, based on a current detected by the current detector 510, the processor 270 may determine that a subpixel having the greatest accumulated current is an expected burn-in subpixel.

Figure 6A:
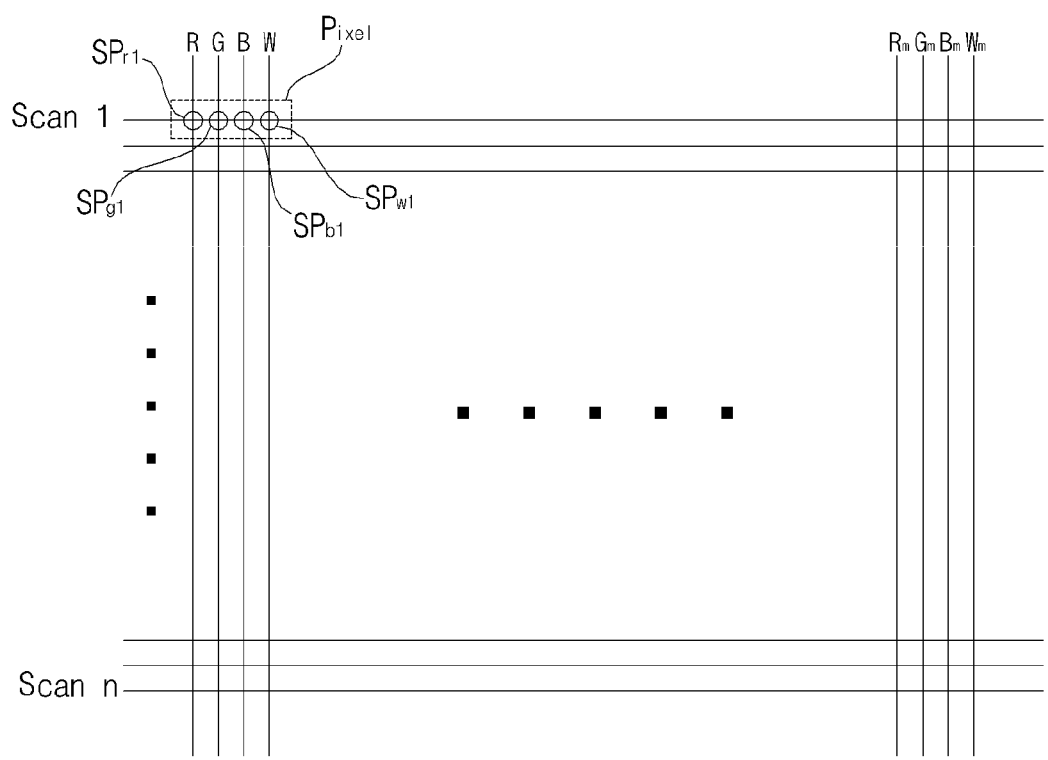
FIGS. 6A and 6B are diagrams referred to in the description of an organic light emitting diode panel FIG. 5.
Figure 6B:
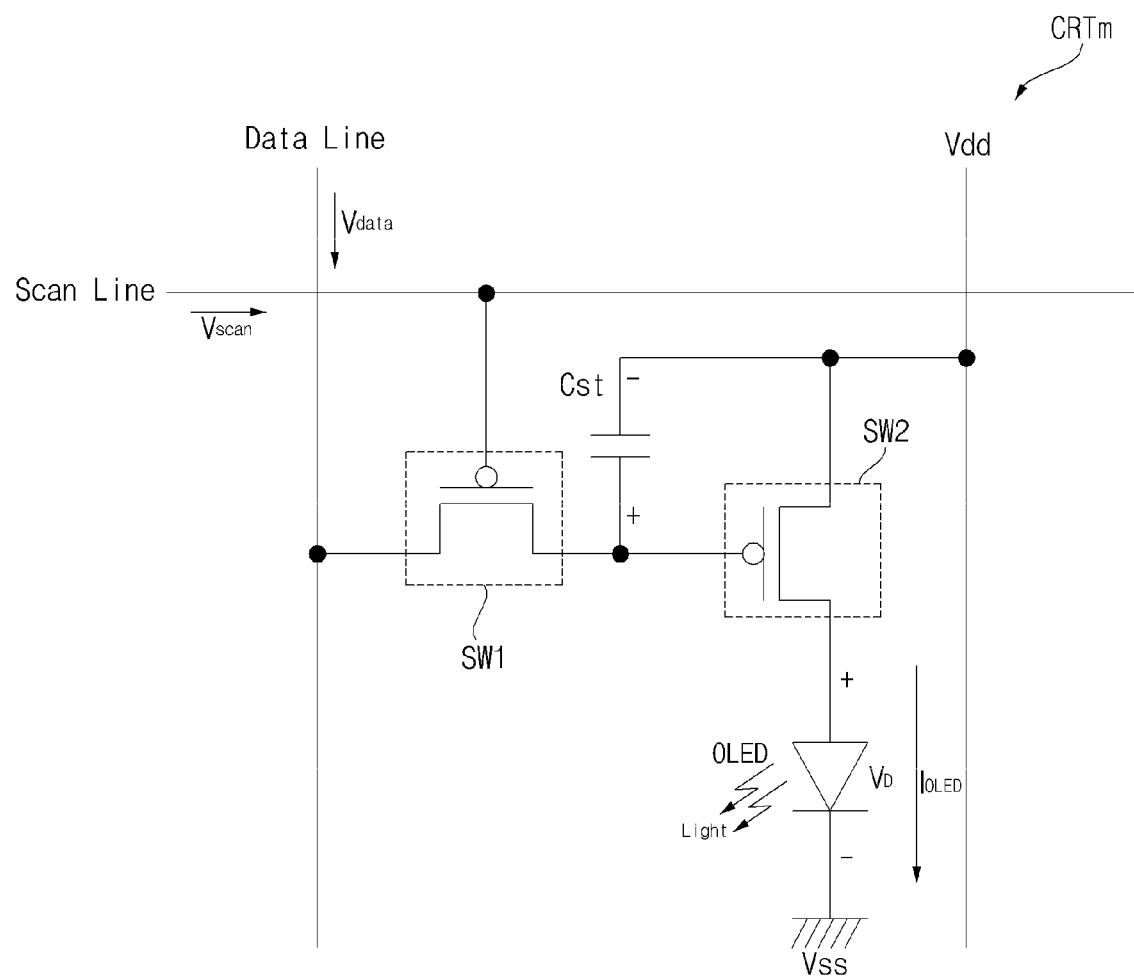

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may comprise a plurality of scan lines Scan 1 to Scan n and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting diode panel 210. In the drawing, a pixel comprising sub-pixels SR1, SG1, SB1 and SW1 of RGBW is shown.

FIG. 6B illustrates a circuit of any one sub-pixel in the pixel of the organic light emitting diode panel of FIG. 6A.

Referring to drawing, an organic light emitting sub pixel circuit (CRTm) may comprise, as an active type, a scan switching element SW1, a storage capacitor Cst, a drive switching element SW2, and an organic light emitting layer (OLED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst changes according to the level difference of the data signal Vdata.

For another example, when the data signal has a different pulse width according to a Pulse Width Modulation (PWM) method, the power level stored in the storage capacitor Cst changes according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may comprise a light emitting layer (EML) of RGBW corresponding to a subpixel, and may comprise at least one of a hole injecting layer (HIL), a hole transporting layer (HTL), an electron transporting layer (ETL), and an electron injecting layer (EIL). In addition, it may comprise a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further comprises green, red, and blue color filters. Meanwhile, since a white subpixel outputs a white light, a separate color filter is not required.

Meanwhile, in the drawing, it is illustrated that a p-type MOSFET is used for a scan switching element SW1 and a drive switching element SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Figure 7:
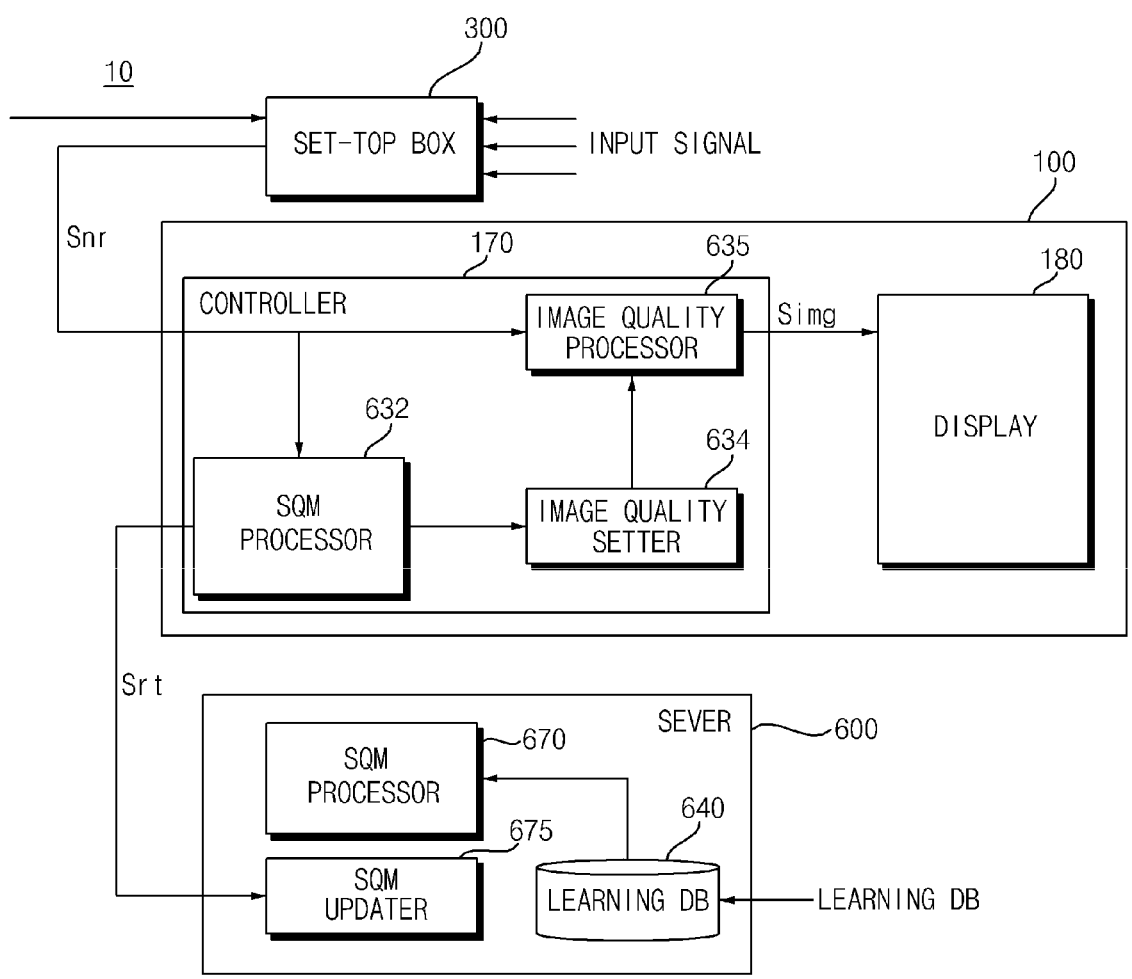
FIG. 7 is an example of an internal block diagram of a controller according to an embodiment of the present disclosure.

FIG. 7 is an example of an internal block diagram of a signal processing device according to an embodiment of the present invention, and FIGS. 8 to 16 are diagrams referred to in the description of operations of the signal processing device shown in FIG. 7.

First, referring to FIG. 7, an image display system 10 according to an embodiment of the present invention may comprise an image display apparatus 100, a server 600, and a set-top box 300.

The server 600 may comprise a learning DB 640 configured to receive a training image and store the received training image; a quality calculator 670 configured to calculate an image source quality using the training image from the learning DB 6400 and a Deep Neural Network (DNN); and an parameter updater 675 configured to update a parameter for the DNN based on the learning DB 640 and the quality calculator 670.

The parameter updater 675 may transmit the updated parameter to a quality calculator 632 of the image display apparatus 100.

The set-top box 300 may receive an input signal from an image provider, and transmit the image signal to an HDMI terminal of the image display apparatus 100.

The image display apparatus 100 may comprise: an image receiver 105 configured to receive an image signal via an external set-top box 300 or a network; a controller 170 configured to perform signal processing on the image signal received by the image receiver 105; and a display 180 configured to display an image processed by the controller 170.

Meanwhile, the image display apparatus 100 may apply an optimal tuning for the quality of an input image.

Meanwhile, the image display apparatus 100 may analyze an input image in real time to determine an original resolution, a noise level, a compression level, and an enhancement level of the input image.

Meanwhile, the image display apparatus 100 may change an image quality setting based on calculated image information data without causing a sense of discomfort or distortion.

Meanwhile, the controller 170 may comprise: the quality calculator 632 configured to calculate original quality of an image signal received from the external set-top box 300 or a network; an image quality setter 634 configured to set the quality of the image signal; and an image quality processor 635 configured to perform image quality processing on the image signal according to the set quality.

If original quality of a received image signal is changed at a first point in time, the image quality setter 634 changes an image quality setting from a first setting to a second setting in a sequence and the image quality processor 635 may perform image quality processing according to the sequential change of the first setting to the second setting. Accordingly, it is possible to reduce flicker when the image quality is changed due to the change of the original quality of the received image signal. In particular, when the original quality of the image signal is changed, the quality may be changed smoothly rather than radically.

Meanwhile, if original quality of a received image signal is modified at a first point in time while an image is reproduced, the image quality setter 634 may sequentially change an image quality setting from a first setting to a second setting. Accordingly, when the original quality of the received image signal is changed, it is possible to change the image quality setting in real time. In particular, when the original quality of the image signal is changed, the image quality may be changed smoothly rather than radically.

Meanwhile, if original quality of a received image signal is changed at a first point in time due to a channel change or an input change while the image signal is received from the set-top box 300, the image quality setter 634 change the image quality from a first setting to a second setting in a sequence. Accordingly, it is possible to reduce flicker when the image quality is changed due to the original quality of the received image signal is changed. In particular, when the original quality of the image signal is changed, the image quality may be changed smoothly rather than radically.

The quality calculator 632 may classify an input image as an UHD (3840×2160 or more), HD (1280×720), or SD (720×480 or more) image.

The quality calculator 632 may calculate a probability for each resolution with respect to an input image, select a resolution having the highest probability as the final resolution and exclude a resolution having a too low probability.

The quality calculator 632 may anticipate a noise level and a compression level in addition to the resolution.

Meanwhile, when calculating the compression level, the quality calculator 632 may determine the compression level based on training data obtained by reducing a compression bit-rate with reference to an original state.

For example, for FHD, the quality calculator 632 may evaluate the current digital TV broadcasting standard as 1.0 and calculate such that the value can be reduced to 0.0 when data be lost as compressed too much.

Meanwhile, the quality calculator 632 may calculate a noise level by measuring a level of flicker in an input image.

For example, the quality calculator 632 may calculate a level of noise in an input image into one of four levels that are high level, medium level, low level, and no-noise level.

Meanwhile, the quality calculator 632 may calculate a resolution and a noise level of a received image signal using a DNN. Accordingly, it is possible to accurately calculate original quality of the received image.

Meanwhile, the quality calculator 632 may update a parameter for the DNN from the server 600, and calculate a resolution and a noise level of a received image signal based on the updated parameter. Accordingly, it is possible to accurately calculate original quality of an image signal based on learning.

Meanwhile, the quality calculator 632 may extract a first region and a second region from the image signal, and calculate an original resolution of the image signal based on the first region and a noise level of the image signal based on the second region. Accordingly, it is possible to accurately calculate the original quality of the image signal based on extraction of a region suitable for the quality calculation.

Meanwhile, the quality calculator 632 may extract a region having the most edge components in the image signal as a first region, and extract a region having the least edge components in the image signal as a second region. Accordingly, it is possible to accurately calculate the original quality of the image signal based on extraction of a region suitable for the quality calculation.

Meanwhile, the image quality processor 635 may increase the noise reduction processing intensity for an image signal as the calculated noise level increases. Accordingly, it is possible to perform image quality processing appropriate for a noise level of a received image signal.

Meanwhile, the quality calculator 632 may calculate an original resolution, a noise level, and a compression level of a received image signal, and calculate the compression level based on training data obtained by reducing a compression bit rate.

Meanwhile, the image quality processor 635 may decrease the enhancement intensity for the image signal as the higher the calculated compression level increases. Accordingly, it is possible to accurately calculate the compression level.

Meanwhile, the image quality processor 635 may increase the enhancement intensity for the image signal as the original resolution of the image signal increases. Accordingly, it is possible to perform image quality processing appropriate for the original resolution of the received image signal.

Meanwhile, the image quality processor 635 may increase a blurring intensity for the image signal as the calculated compression level increases. Accordingly, it is possible to perform image quality processing appropriate for a compression level of a received image signal.

Meanwhile, the image quality processor 635 may decrease the filter used to filter the image signal as the original resolution of the image signal increases. Accordingly, it is possible to perform image quality processing appropriate for the original resolution of the received image signal.

Meanwhile, the image quality processor 635 may downscale an image signal according to an original resolution of an image signal, perform image quality processing on the downscaled image signal, upscales the image-quality-processed image signal, and output the upscaled image signal. Accordingly, it is possible to perform image quality processing appropriate for the original resolution of the received image signal.

Figure 8:
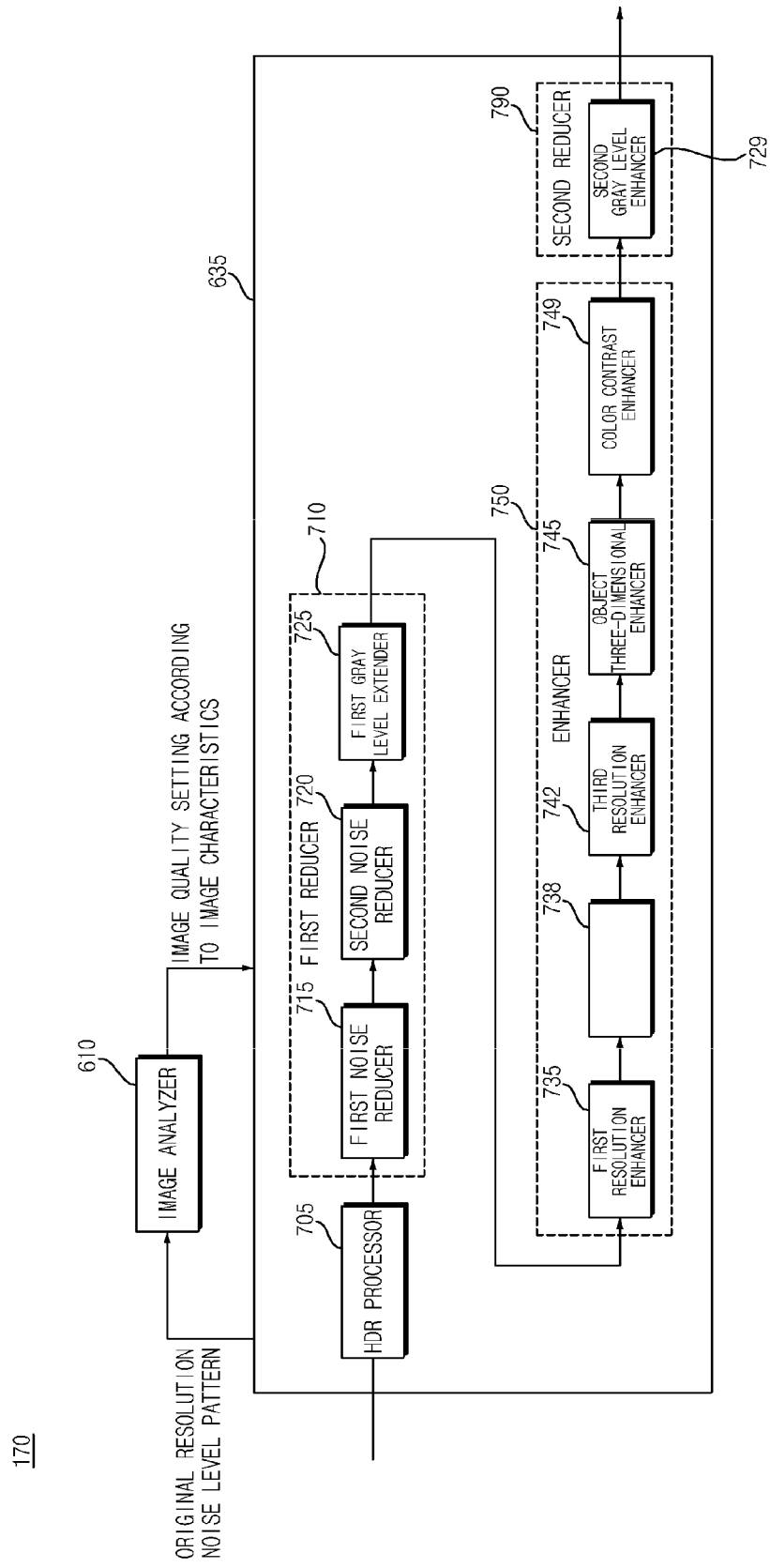
FIGS. 8 to 9B are diagrams referred to in the description of operation of the controller of FIG. 7.

FIG. 8 is an example of an internal block diagram of the controller 170 in FIG. 7.

Meanwhile, the controller 170 in FIG. 8 may correspond to the controller 170 in FIG. 2.

First, referring to FIG. 8, the controller 170 according to an embodiment of the present invention may comprise an image analyzer 610 and an image quality processor 635.

The image analyzer 610 may comprise the quality calculator 632 shown in FIG. 7 and an image quality setter 634.

The image analyzer 610 may analyze an input image signal, and output information related to the analyzed input image signal.

Meanwhile, the image analyzer 610 may differentiate an object region and a background region of a first input image signal. Alternatively, the image analyzer 610 may calculate a probability or percentage of the object region and the background region of the first input image signal.

The input image signal may be an input image signal from an image receiver 105 or an image decoded by the image decoder 320 in FIG. 3.

In particular, the image analyzer 610 may analyze an input image signal using artificial intelligence (AI), and output information on the analyzed input image signal.

Specifically, the image analyzer 610 may output a resolution, gray level, a noise level, and a pattern of an input image signal, and output information on the analyzed input image signal, especially image setting information, to the image quality processor 635.

The image quality processor 635 may comprise an HDR processor 705, a first reducer 710, an enhancer 750, and a second reducer 790.

The HDR processor 705 may receive an image signal and perform high dynamic range (HDR) processing on the input image signal.

For example, the HDR processor 705 may convert a standard dynamic range (SDR) image signal into an HDR image signal.

For another example, the HDR processor 705 may receive an image signal, and perform gray level processing on the input image signal for an HDR.

Meanwhile, if an input image signal is an SDR image signal, the HDR processor 705 may bypass gray level conversion, and, if an input image signal is an HDR image signal, the HDR processor 705 perform gray level conversion. Accordingly, it is possible to improve high gray level expression for an input image.

Meanwhile, the HDR processor 705 may perform gray level conversion processing based on a first gray level conversion mode, in which low gray level is to be enhanced and high gray level is to be saturated, and a second gray level conversion mode, in which low gray level and high gray level are somewhat uniformly converted.

Specifically, if the first gray level conversion mode is implemented, the HDR processor 705 may perform gray level conversion processing based on data corresponding to the first gray level conversion mode in a lookup table.

More specifically, if the first gray level conversion mode is implemented, the HDR processor 705 may perform gray level conversion processing based on an equation for input data and the first gray level conversion mode in a lookup table determined by the equation. Here, the input data may comprise video data and metadata.

Meanwhile, if the second gray level conversion mode is implemented, the HDR processor 705 may perform gray level conversion processing based on data corresponding to the second gray level conversion mode in a lookup table.

More specifically, if the second gray level conversion mode is implemented, the HDR processor 705 may perform gray level conversion processing based on an equation for input data and data corresponding to the second gray level conversion mode in a lookup table determined by the equation. Here, the input data may comprise video data and metadata.

Meanwhile, the HDR processor 705 may select the first gray level conversion mode or the second gray level conversion mode according to a third gray level conversion mode or a fourth gray level conversion mode in a high gray level amplifier 851 in the second reducer 790.

For example, if the third gray level conversion mode is implemented, the high gray level amplifier 851 in the second reducer 790 may perform gray level conversion processing based on data corresponding to the third gray level conversion mode in a lookup table.

Specifically, if the third gray level conversion mode is implemented, the high gray level amplifier 851 in the second reducer 790 may perform gray level conversion processing based on an equation for input data and data corresponding to the third gray level conversion mode in a lookup table determined by the equation. Here, the input data may comprise video data and metadata.

Meanwhile, if the fourth type gray level conversion is implemented, the high gray level amplifier 851 in the second reducer 790 may perform gray level conversion processing based on data corresponding to the fourth gray level conversion mode in a lookup table.

Specifically, if the fourth gray level conversion mode is implemented, the high gray level amplifier 851 in the second reducer 790 may perform gray level conversion processing based on an equation for input data and data corresponding to the fourth gray level conversion mode in a lookup table determined by the equation. Here, the input data may comprise video data and metadata.

For example, if the fourth gray level conversion mode is implemented in the high gray level amplifier 851 in the second reducer 790, the HDR processor 705 may implement the second gray level conversion mode.

For another example, if the third gray level conversion mode is implemented in the high gray level amplifier 851 in the second reducer 790, the HDR processor 705 may implement the first gray level conversion mode.

Alternatively, the high gray level amplifier 851 in the second reducer 790 may change a gray level conversion mode according to a gray level conversion mode in the HDR processor 705.

For example, if the second gray level conversion mode is implemented in the HDR processor 705, the high gray level amplifier 851 in the second reducer 790 may perform the fourth gray level conversion mode.

For another example, if the first gray level conversion mode is implemented in the HDR processor 705, the high gray level amplifier 851 in the second reducer 790 may implement the third gray level conversion mode.

Meanwhile, the HDR processor 705 according to an embodiment of the present invention may implement a gray level conversion mode so that low gray level and high gray level are converted uniformly.

Meanwhile, according to the second gray level conversion mode in the HDR processor 705, the second reducer 790 may implement the fourth gray level conversion mode and thereby amplify an upper limit on gray level of a received input signal. Accordingly, it is possible to improve high gray level expression for the input image.

Next, the first reducer 710 may perform noise reduction on an input image signal or an image signal processed by the HDR processor 705.

Specifically, the first reducer 710 may perform a plurality of stages of noise reduction processing and a first stage of gray level extension processing on an input image signal or an HDR image from the HDR processor 705.

To this end, the first reducer 710 may comprise a plurality of noise reducers 715 and 720 for reducing noise in a plurality of stages, and a first gray level extender 725 for extending gray level.

Next, the enhancer 750 may perform a plurality of stages of image resolution enhancement processing on an image from the first reducer 710.

In addition, the enhancer 750 may perform object three-dimensional effect enhancement processing. In addition, the enhancer 750 may perform color or contrast enhancement processing.

To this end, the enhancer 750 may comprise: a plurality of resolution enhancers 735, 738, 742 for enhancing a resolution of an image in a plurality of stages; an object three-dimensional effect enhancer 745 for enhancing a three-dimensional effect of an object; and a color contrast enhancer 749 for enhancing color or contrast.

Next, the second reducer 790 may perform a second stage of gray level extension processing based on a noise-reduced image signal received from the first reducer 710.

Meanwhile, the second reducer 790 may amplify an upper limit on gray level of an input signal, and extend a resolution of high gray level of the input signal. Accordingly, it is possible to improve high gray level expression for an input image.

For example, gray level extension may be performed uniformly on the entire gray level range of a input signal. Accordingly, gray level extension is performed uniformly on the entire area of an input image, thereby improving high gray level expression.

Meanwhile, the second reducer 790 may perform gray level amplification and extension based on a signal received from the first gray level extender 725. Accordingly, it is possible to improve high gray level expression for an input image.

Meanwhile, if an input image signal input is an SDR image signal, the second reducer 790 may vary the degree of amplification based on a user input signal. Accordingly, it is possible to improve high gray level expression in response to a user setting.

Meanwhile, if an input image signal is an HDR image signal, the second reducer 790 may perform amplification according to a set value. Accordingly, it is possible to improve high gray level expression for an input image.

Meanwhile, if an input image signal is an HDR image signal, the second reducer 790 may vary the degree of amplification based on a user input signal. Accordingly, it is possible to improve high gray level expression according to a user setting.

Meanwhile, in the case of extending gray level based on a user input signal, the second reducer 790 may vary the degree of extension of gray level. Accordingly, it is possible to improve high gray level expression according to a user's setting.

Meanwhile, the second reducer 790 may amplify an upper limit on gray level according to a gray level conversion mode in the HDR processor 705. Accordingly, it is possible to improve high gray level expression for an input image.

The controller 170 comprises the HDR processor 705 configured to receive an image signal and adjust luminance of the input image signal, and the reducer 790 configured to amplify brightness of the image signal received from the HDR processor 705 and increase gray level resolution of the image signal to thereby generate an enhanced image signal. The enhanced image signal provides increased luminance and increased gray level resolution of the image signal while a high dynamic range in a displayed HDR image is maintained.

Meanwhile, the range of brightness of the image signal is adjusted by a control signal received by the controller 170.

Meanwhile, the controller 170 further comprises an image analyzer configured to determine whether an input image signal is an HDR signal or an SDR signal, and generate a control signal to be provided to the HDR processor 705. The range of brightness of an input image signal is adjusted by a control signal only when the input image signal is an HDR signal.

Meanwhile, the control signal is received from a controller of an image display apparatus, which relates to signal processing, and the control signal corresponds to a setting of the image display apparatus.

Meanwhile, a resolution of gray level is increased based on amplification of adjusted brightness of an image signal.

Meanwhile, a resolution of gray level is increased based on a control signal received by the controller 170.

Meanwhile, a control signal is received from a controller of an image display apparatus, which relates to signal processing, and the control signal corresponds to a setting of the image display apparatus.

Meanwhile, the reducer 790 may comprise the high gray level amplifier 851 configured to amplify an upper limit on gray level of an input signal, and a decontouring processor 842 and 844 configured to extend the resolution of gray level amplified by the high gray level amplifier 851.

The second reducer 790 may comprise a second gray level extender 729 for a second stage of gray level extension.

Meanwhile, the image quality processor 635 in the controller 170 according to the present invention is characterized in performing four stages of reduction processing and four stages of image enhancement processing, as shown in FIG. 8.

Here, the four stages of reduction processing may comprise two stages of noise reduction processing and two stages of gray level extension processing.

Herein, the two stages of noise reduction processing may be performed by the first and second noise reducers 715 and 720 in the first reducer 710, and the two stages of gray level extension processing may be performed by the first gray level extender 725 in the first reducer 710 and the second gray level extender 729 in the second reducer 790.

Meanwhile, the four stages of image enhancement processing may comprise three stages of image resolution enhancement (bit resolution enhancement) and object three-dimensional effect enhancement.

Here, the three stages of image enhancement processing may be performed by the first to third resolution enhancers 735, 738, and 742, and the object three-dimensional effect enhancement may be performed by the object three-dimensional enhancer 745.

Meanwhile, the controller 170 of the present disclosure may perform image quality processing in a plurality of stages, in which an image quality may be improved gradually by applying the same algorithm or similar algorithms a plurality of times.

To this end, the image quality processor 635 of the controller 170 of the present disclosure may perform image quality processing by applying the same algorithm or similar algorithms two or more times.

Meanwhile, the same algorithm or the similar algorithms implemented by the image quality processor 635 have a different purpose to achieve in each stage. In addition, since image quality processing is performed gradually in a plurality of stages, there is an advantageous effect to cause a less number of artifacts to appear in an image, resulting in a more natural and more vivid image processing result.

Meanwhile, the same algorithm or the similar algorithms are applied plurality of times alternately with a different image quality algorithm, thereby bringing an effect more than simple continuous processing.

Meanwhile, the controller 170 of the present disclosure may perform noise reduction processing in a plurality of stages. Each stage of the noise reduction processing may comprise temporal processing and spatial processing.

Meanwhile, in order to calculate an original quality of an image signal, the present disclosure uses the state-of-the-art technology such as artificial intelligence (AI). To this end, a Deep Neural Network (DNN) may be used.

The quality calculator 632 may calculate a resolution and a noise level of an input image signal by using a Deep Neural Network (DNN).

The quality calculator 632 or the quality calculator 670 may obtain an original resolution and a training image for each compression rate, and train the network so as to increase accuracy of the calculation.

A variety of images which can be commonly seen in ordinary broadcasting programs are provided as images used for the training, and thus, it is possible to cover any input environment.

Meanwhile, in order to reduce detection time or cost, the quality calculator 632 may perform learning using Convolutional Neural Network, Mobile-Net, and the like which has a small number of layers.

For example, the quality calculator 632 may analyze only some regions (e.g., 224×224, 128×128, 64×64, etc.) in an entire image.

Meanwhile, the quality calculator 632 may select a detection region appropriate for a purpose of detection.

For example, the quality calculator 632 may select a first region having the greatest number of edge components when detecting an original resolution, and select a second region having the least number of edge components when detecting noise.

In particular, the quality calculator 632 may apply an algorithm that selects a detection region in a short time in order to increase a processing speed.

For example, the quality calculator 632 may perform pre-processing, such as Fast Fourier Transform (FFT), on a detection region.

Figure 9A:
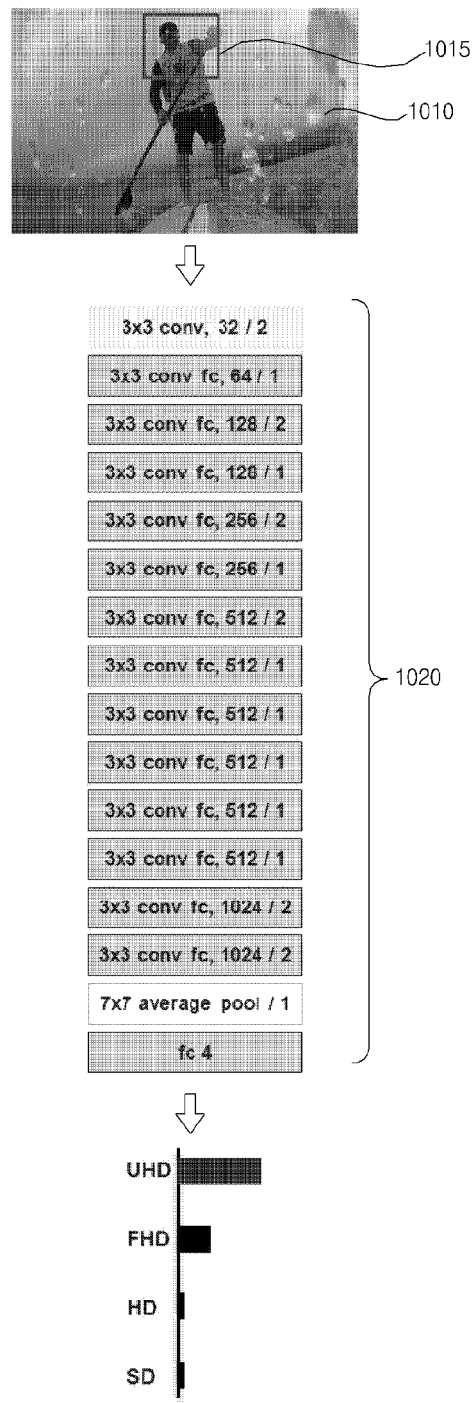

FIG. 9A is a diagram showing calculation based on a Convolutional Neural Network (CNN).

Referring to the drawing, a convolutional neural network is used for a particular region 1015 in an acquired image 1010.

As the convolution neural network, a convolution network and a deconvolution network may be implemented.

According to the convolution neural network, convolution and pooling are performed repeatedly.

Figure 10A:
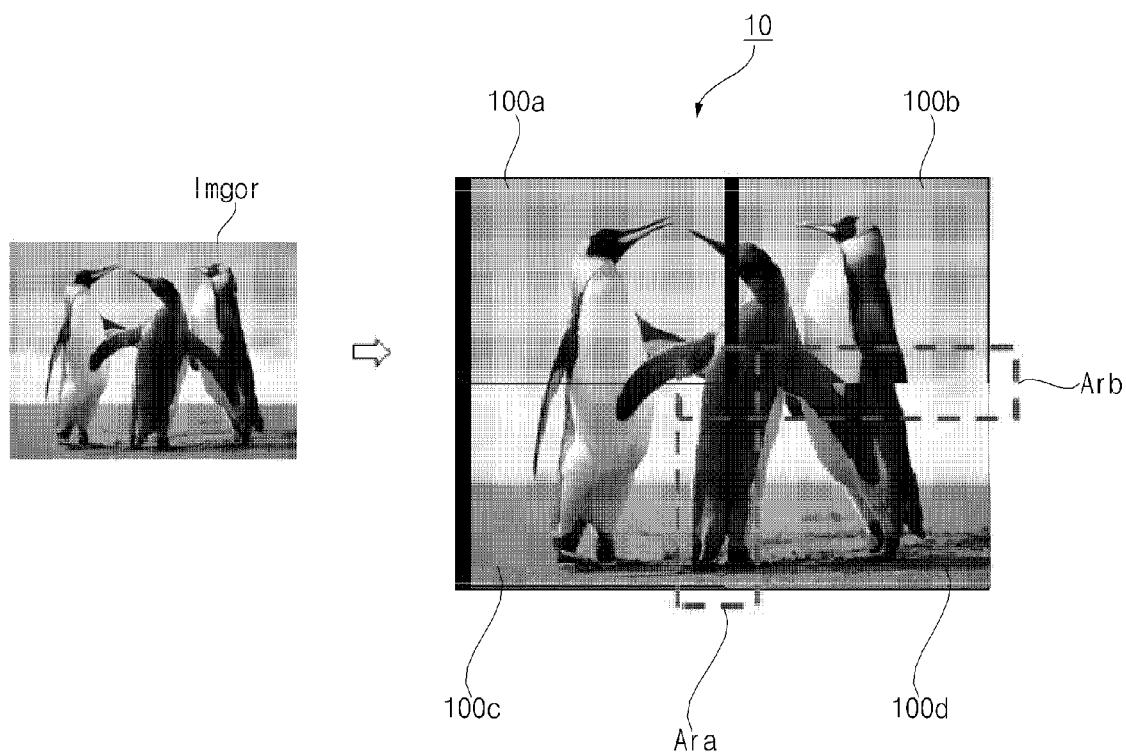
FIGS. 10A and 10B are diagrams referred to in the description of pixel shifting in a video wall.

Meanwhile, according to the CNN scheme shown in FIG. 10A, information on a region 1015 may be used to determine types of pixels in the region 1015.

FIG. 9B is a diagram showing calculation based on Mobile-Net.

According to the scheme shown in the drawing, quality calculation is performed.

Meanwhile, the controller 170 of the present disclosure may apply, as original quality changes, an image quality setting corresponding to the changed quality in real time.

In particular, in the case of changing an image quality setting, the controller 170 may apply the change of the image quality setting without any condition such as a channel change or an input change while an image is reproduced.

In this case, "real time" refers to employing a temporal processing technique comprising imaging infrared (IIR) and step movement.

Figure 10B:
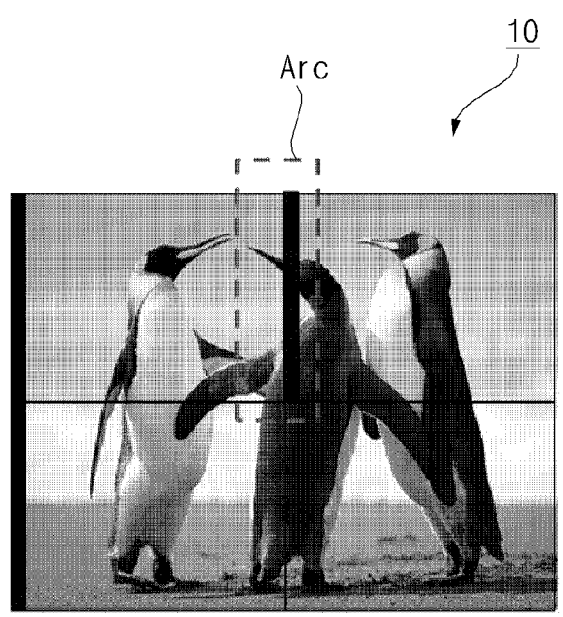

FIGS. 10A and 10B are diagrams referred to in the description of pixel shifting in a video wall 10.

First, referring to FIG. 10A, an input image Imgor to be displayed on the video wall 10 is divided by the image divider 160.

As illustrated in the drawing, if the video wall 10 comprises 2*2 image display apparatuses 100a to 100d, the image divider 160 divides an image into four areas of 2*2.

Meanwhile, in the image display apparatuses 100a to 100d having an organic light emitting diode (OLED) panel, a pixel shifting method is used for still images in order to prevent an afterimage caused by burn-in.

However, when pixel shifting is used for the video wall 10, pixel shifts between the image display apparatuses 100a to 100d are not aligned, such that misaligned image areas Ara and Arb may occur.

Meanwhile, when pixel shifting is performed in the video wall 10, pixel shifts between the image display apparatuses 100a to 100d are not aligned, such that a black area or black bar occurs at a center portion Arc.

Accordingly, the present disclosure provides a method of reducing image misalignment or the occurrence of black areas by using the pixel shifting method in the image display apparatuses 100a to 100d having an OLED panel.

In addition, by applying the pixel shifting method, which has been applied only to still images, to repeated videos, the present disclosure provides a method of reducing an afterimage caused by burn-in which occurs due to repeated videos, and reducing image misalignment or the occurrence of black areas. A description thereof will be made with reference to FIG. 11 and the following figures.

FIG. 11 is a flowchart illustrating an operating method of a video wall according to an embodiment of the present disclosure, and FIGS. 12A to 19 are diagrams referred to in the description of operation of FIG. 11.

First, referring to FIG. 11, the plurality of image display apparatuses 100a to 100d in the video wall 10 may display an input video on a plurality of displays 180a to 180d (S1110).

To this end, the image divider 160 divides the input video and transmits the divided plurality of videos to the respective image display apparatuses 100a to 100d.

Then, a first controller 170a in the first image display apparatus 100a determines whether the displayed video is repeatedly played back (S1120).

If the displayed video is repeatedly played back, the first controller 170a in the first image display apparatus 100a may store boundary images of the video displayed on the respective displays 180a to 180d, and may transmit the stored boundary images to adjacent image display apparatuses 100a to 100d (S11300.

Meanwhile, the respective image display apparatuses 100a to 100d may transmit pixel shift information to adjacent image display apparatuses 100a to 100d (S1135).

Accordingly, the respective image display apparatuses 100a to 100d may generate a synthetic image based on the pixel shift information, the received boundary image, and the input image which is input to be displayed, and may select a partial area of the synthetic image to display the selected partial area of the image (S1140).

Meanwhile, if the video displayed on the plurality of image display apparatuses 100a to 100d is repeatedly played back, the respective image display apparatuses 100a to 100d may store boundary areas displayed on the plurality of image display apparatuses 100a to 100d, and may transmit the stored boundary areas to adjacent image display apparatuses 100a to 100d.

Accordingly, the respective image display apparatuses 100a to 100d may synthesize the received boundary area with an image area to be displayed, and may display a portion of the synthesized image, thereby reducing an afterimage and the occurrence of black areas on the video wall 10. Particularly, the occurrence of black areas may be reduced while reducing the afterimage on the video wall 10, on which the video is repeatedly displayed.

For example, the controller 170a of the first image display apparatus 100a, among the plurality of image display apparatuses 100a to 100d, may determine whether the video displayed on the plurality of image display apparatuses 100a to 100d is repeatedly played back, and if the video displayed on the plurality of image display apparatuses 100a to 100d is repeatedly played back, the controller 170a of the first image display apparatus 100a may store a boundary area and may generate a synthetic image. Accordingly, the occurrence of black areas may be reduced while reducing the afterimage on the video wall 10, on which a video is repeatedly displayed.

Meanwhile, in response to performing pixel shifting while the video displayed on the plurality of image display apparatuses 100a to 100d is repeatedly played back, the controller 170a of the first image display apparatus 100a, among the plurality of image display apparatuses 100a to 100d, may transmit direction information of the pixel shifting to the plurality of image display apparatuses 100a to 100d. Accordingly, the occurrence of black areas may be reduced while reducing the afterimage on the video wall 10, on which the video is repeatedly displayed.

Meanwhile, while the video displayed on the plurality of image display apparatuses 100a to 100d is repeatedly played back, the controller 170a of the first image display apparatus 100a, among the plurality of image display apparatuses 100a to 100d, may control pixel shifting to be performed collectively on the plurality of image display apparatuses 100a to 100d. Accordingly, the occurrence of black areas may be reduced while reducing the afterimage on the video wall 10, on which a video is repeatedly displayed.

Meanwhile, in response to performing shifting in a first direction at a first time point while the video displayed on the plurality of image display apparatuses 100a to 100d is repeatedly played back, the controller 170a of the first image display apparatus 100a, among the plurality of image display apparatuses 100a to 100d, may transmit a first boundary area in the first direction, which is displayed on the first image display apparatus 100a, to the second image display apparatus 100b disposed adjacent to the first direction.

In response, the second image display apparatus 100b may synthesize the input image with the first boundary area to generate a synthetic image, and may display the synthetic image except for the boundary area in the first direction. Accordingly, the occurrence of black areas may be reduced while reducing the afterimage on the video wall 10.

Meanwhile, in response to performing shifting in a second direction at a second time point after the first time point while the video displayed on the plurality of image display apparatuses 100a to 100d is repeatedly played back, the first image display apparatus 100a may transmit a second boundary area in the second direction, which is displayed on the first image display apparatus 100a, to the third image display apparatus 100c disposed adjacent to the second direction.

In response, the third image display apparatus 100c may synthesize the input image with a third boundary area to generate a synthetic image, and may display the synthetic image except for the boundary area in a third direction. Accordingly, the occurrence of black areas may be reduced while reducing the afterimage on the video wall 10, on which a video is repeatedly displayed.

Meanwhile, while the video displayed on the plurality of image display apparatuses 100a to 100d is repeatedly played back, the respective image display apparatuses 100a to 100d perform different pixel shifting operations, and the respective image display apparatuses 100a to 100d may generate a synthesized area based on boundary areas of adjacent image display apparatuses 100a to 100d and the input image, and may display an image of the synthesized area except for a boundary area in a pixel shifting direction. Accordingly, the occurrence of black areas may be reduced while reducing the afterimage on the video wall 10, on which a video is repeatedly displayed.

Meanwhile, among the plurality of image display apparatuses 100a to 100d, while the second image display apparatus 100b is disposed in the first direction of the first image display apparatus 100a and the third image display apparatus 100c is disposed in the second direction, when the video displayed on the plurality of image display apparatuses 100a to 100d is repeatedly played back, shifting in the first direction may be performed by the second image display apparatus 100b and shifting in the third direction may be performed by the third image display apparatus 100c at the first time point.

In this case, the second image display apparatus 100b may synthesize an input image with a first boundary area in the first direction, which is displayed on the first image display apparatus 100a, to generate a synthetic image, and may display the synthetic image except for the boundary area in the first direction.

In response, the third image display apparatus 100c may synthesize the input image with a second boundary area in a second direction, which is displayed on the first image display apparatus 100a, to generate a synthetic image, and may display the synthetic image except for the boundary area in the second direction. Accordingly, the occurrence of black areas may be reduced while reducing the afterimage on the video wall 10, on which the video is repeatedly displayed.

Meanwhile, while the video displayed on the plurality of image display apparatuses 100a to 100d is repeatedly played back, a movement amount of the pixel shift may vary at each scene change. Accordingly, the occurrence of black areas may be reduced while reducing the afterimage on the video wall 10, on which the video is repeatedly displayed.

Meanwhile, as a movement amount of the pixel shift changes at each scene change, a size of the boundary area may vary and may be transmitted. Accordingly, the occurrence of black areas may be reduced while reducing the afterimage on the video wall 10, on which a video is repeatedly displayed.

Meanwhile, while a video displayed on the plurality of image display apparatuses 100a to 100d is repeatedly played back, images of boundary areas may be sequentially transmitted to adjacent image display apparatuses 100a to 100d. Accordingly, the occurrence of black areas may be reduced while reducing the afterimage on the video wall 10, on which the video is repeatedly displayed.

Meanwhile, when the video displayed on the plurality of image display apparatuses 100a to 100d is repeatedly played back, a first boundary image in the first image, which is input to the first image display apparatus 100a among the plurality of image display apparatuses 100a to 100d, is synthesized with a second image input to the second image display apparatus 100b disposed adjacent to the first image display apparatus 100a, such that a portion of the synthesized image may be displayed on the second image display apparatus 100b. Accordingly, the occurrence of black areas may be reduced while reducing the afterimage on the video wall 10. Particularly, the occurrence of black areas may be reduced while reducing the afterimage on the video wall 10, on which the video is repeatedly displayed.

Meanwhile, if the video is repeatedly played back, at least one controller of the plurality of image display apparatuses 100a to 100d may extract eigenvalues of each input frame, and may compare the eigenvalues to determine whether a currently input frame is repeated and determine a position of the repeated frame.

Meanwhile, the video applied to the video wall 10 has characteristics in that frames are repeated while separate images are input to the respective displays in the entire video wall 10, and the frames are repeated at the same position.

By using such characteristics, a boundary image of the repeated frames may be stored and transmitted to adjacent image display apparatuses, such that the image may be output simultaneously at a corresponding position of the repeated frames, thereby obtaining the same effect as image shifting in one system.

Figure 12A:
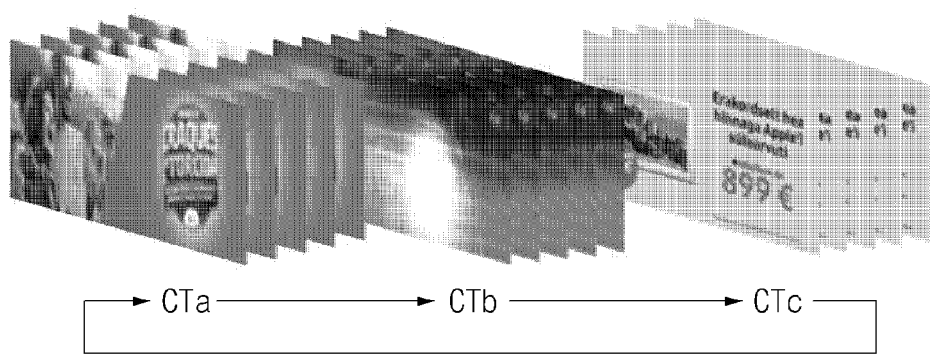

FIG. 12A is a diagram illustrating a case where a video is repeatedly played back.

In the drawing, an example is illustrated in which a first content CTa, a second content CTb, and a third content CTc are sequentially played back and repeated.

In determination as to whether a video is repeated, when the first to third contents are repeated, it may be determined that the video is repeated, but the determination is not limited thereto, and various modifications may be made.

For example, when only the first content CTa as a single content is repeated, it may be determined that a video is repeated.

Figure 12B:
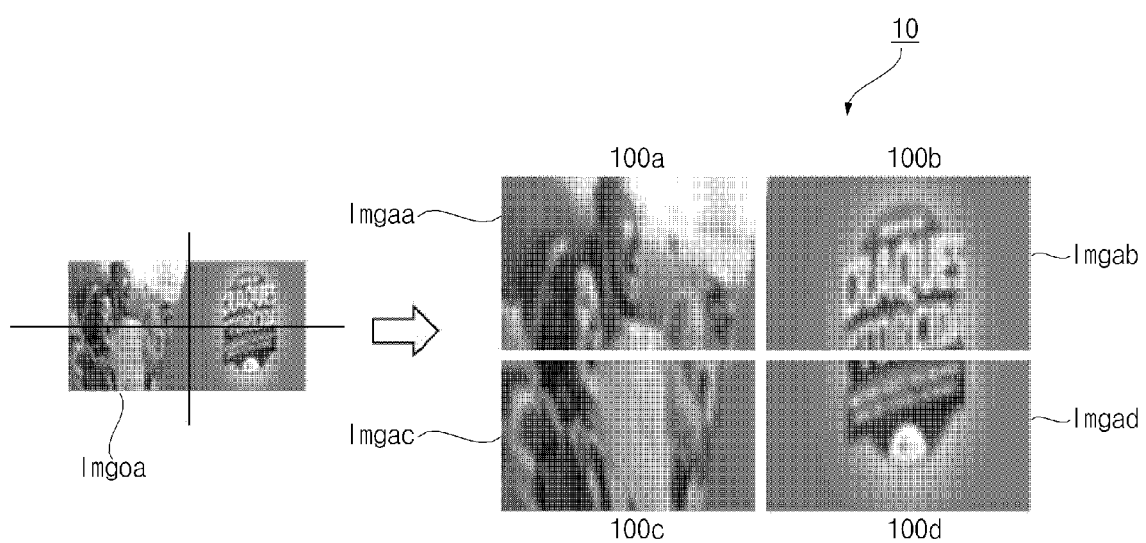

FIG. 12B is a diagram illustrating an example in which a single image Imgoa is divided into 2*2 images, such that four images Imgaa to Imgad are displayed on the first to fourth image display apparatuses 100a to 100d, respectively, of the video wall 10.

Figure 13A:
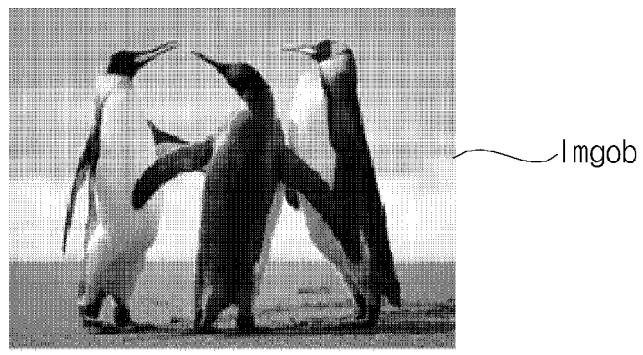

FIG. 13A illustrates a single image Imgob.

Figure 13B:
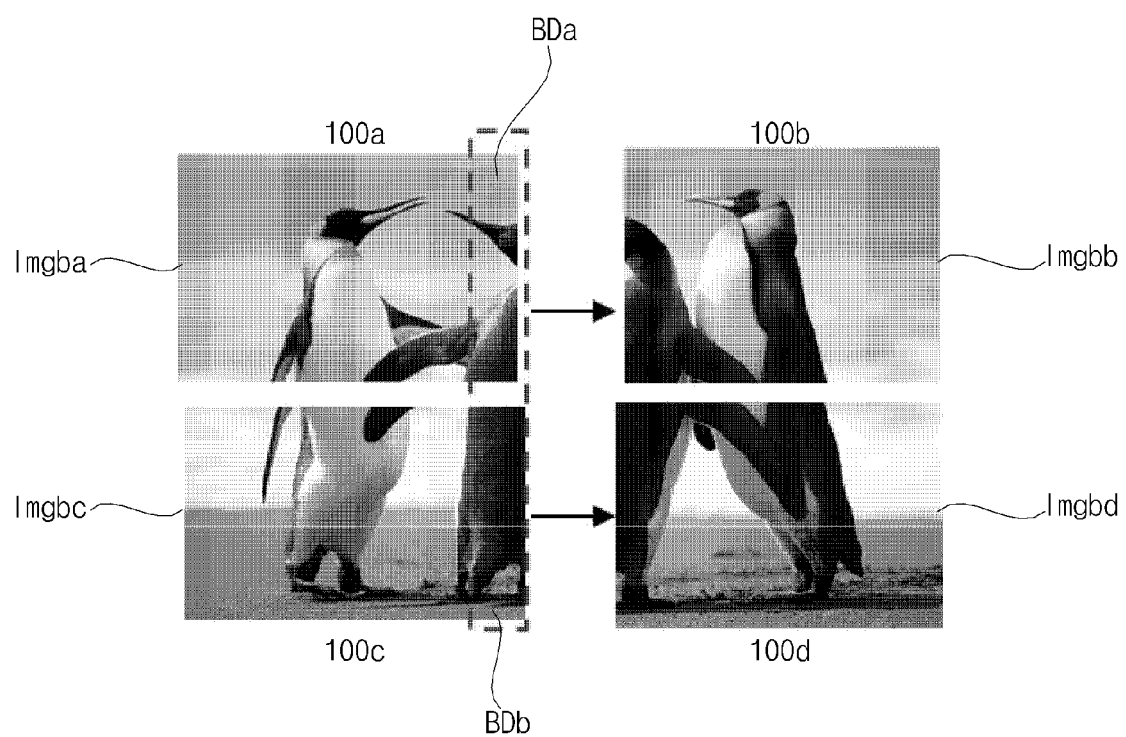

FIG. 13B is a diagram illustrating an example in which a single image Imgob is divided into 2*2 images, such that four images Imgba to Imgbd are displayed at a first time point on the first to fourth image display apparatuses 100a to 100d, respectively, of the video wall 10.

In this case, in order to prevent an afterimage caused by burn-in, pixel shifting may be performed. For example, pixel shifting may be performed in the right direction of the drawing.

In this case, it is preferable that a right boundary area Boa, which is a portion of the image displayed on the first image display apparatus 100a, and a right boundary area Bob, which is a portion of the image displayed on the third image display apparatus 100c, are stored and transmitted to the second image display apparatus 100b and the fourth image display apparatus 100d which are adjacent image display apparatuses.

Figure 13C:
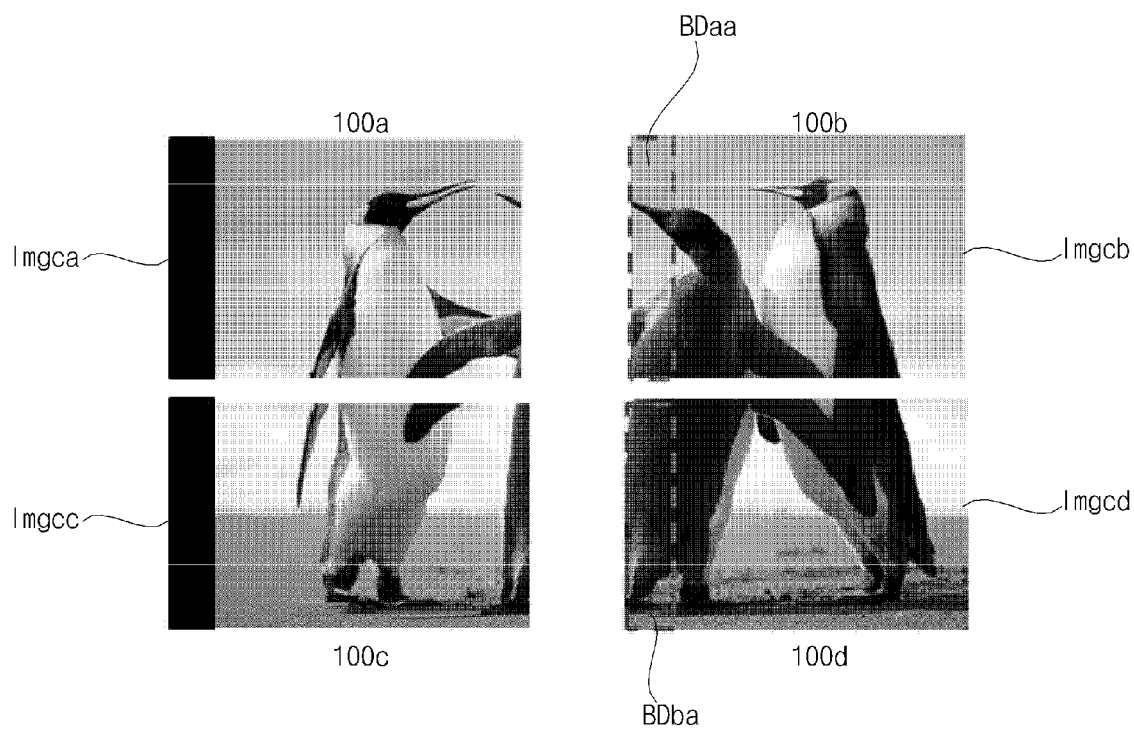

Accordingly, as illustrated in FIG. 13C, four images Imgca to Imgcd may be displayed on the first to fourth image display apparatuses 100a to 100d, respectively, of the video wall 10 at a second time point after the first time point.

Particularly, the images displayed on the second image display apparatus 100b and the fourth image display apparatus 100d are synthetic images acquired by synthesizing right boundary areas Boa and Bob with input images, and a full image, from which black areas are removed, may be displayed on left areas BDaa and BDba of the displayed images. Accordingly, a possibility of the occurrence of black areas may be reduced while reducing an afterimage caused by burn-in, which occurs while a video is repeatedly displayed.

Meanwhile, when pixels are moved in a downward direction on the video wall 10, a lower boundary area may be stored and transmitted. In this case, it is important to synchronize and transmit the boundary area for each of a plurality of image frames.

Figure 15A:
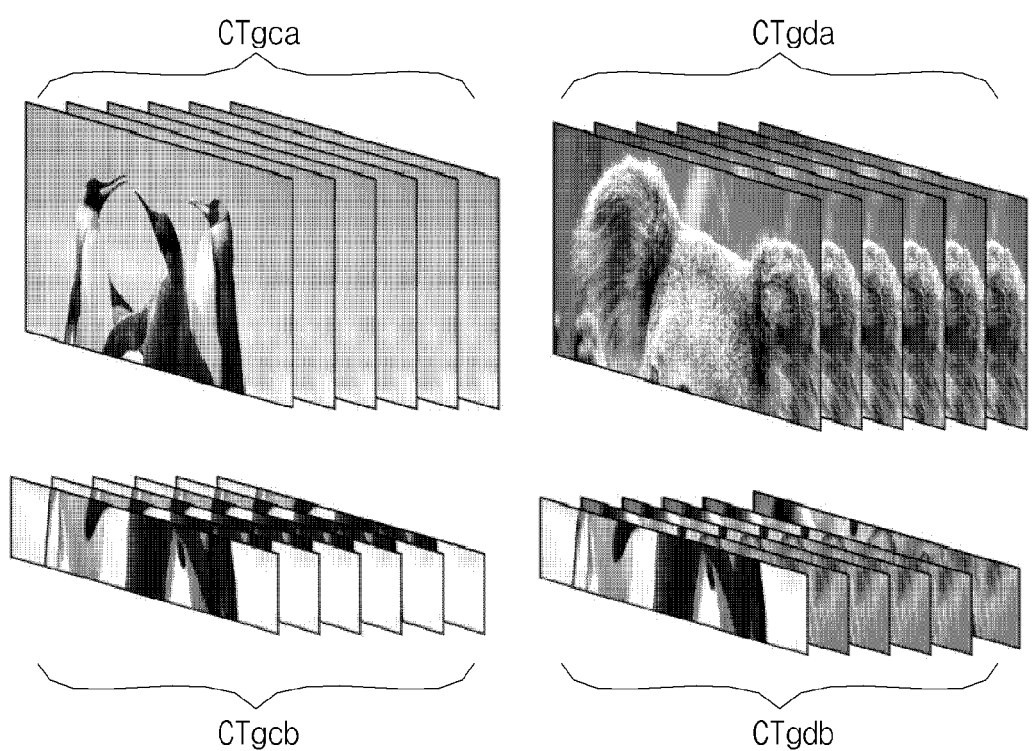

FIG. 15A illustrates an example in which a lower boundary area CTgcb of a repeated content CTgca is separated and transmitted to an adjacent image display apparatus.

In this case, as illustrated in the drawing, if the boundary area is not synchronized and transmitted for each image frame, the lower boundary area and the input image may be synthesized without being matched, as shown in a first frame on the right side of FIG. 15A.

In order to prevent this from occurring, it is important to synchronize the boundary areas for each image frame and to sequentially transmit the areas.

Figure 15B:
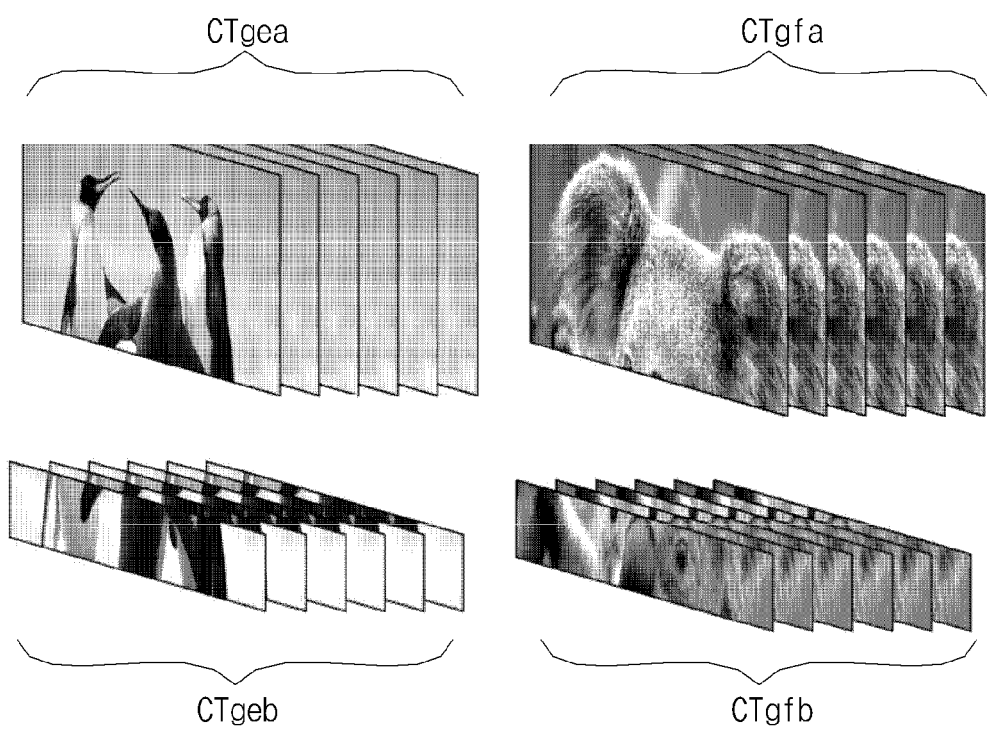

FIG. 15B is a diagram illustrating an example in which a lower boundary area CTgeb of a repeated content CTgea is separated and transmitted to an adjacent image display apparatus.

In this case, as illustrated in the drawing, if the boundary area is synchronized and transmitted for each image frame, the lower boundary area and the input image may be matched and synthesized for the entire frame, thereby allowing natural image synthesis and display.

Figure 16:
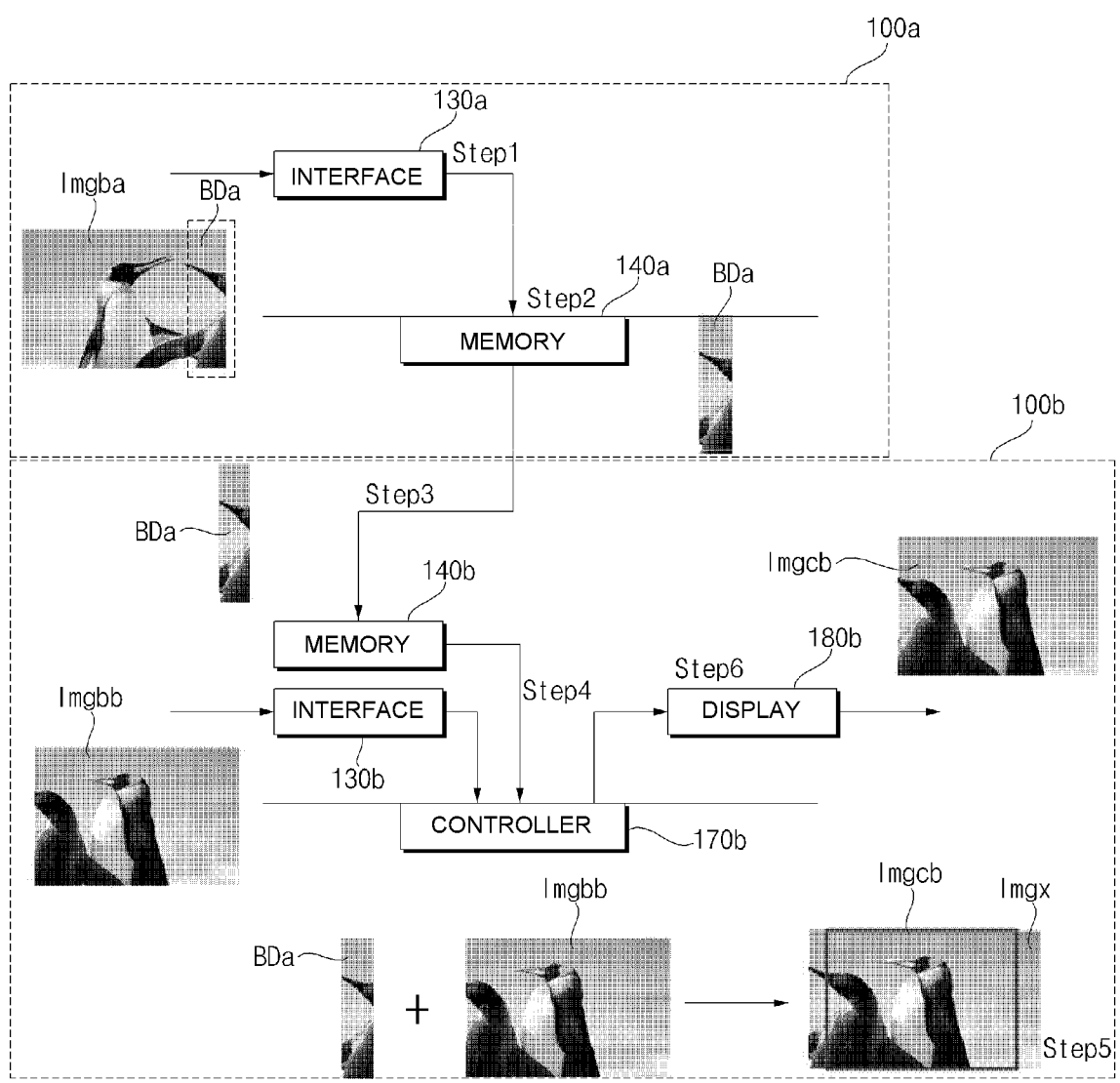

FIG. 16 is a diagram referred to in the description of an example of storing and transmitting boundary areas and synthesizing images.

Referring to the drawing, while a first image Imgba is displayed on the first image display apparatus 100a at the first time point, when pixel shifting in the right direction is performed by the second image display apparatus 100b, a right boundary area BDa of the first image Imgba, input and displayed through an interface 130a, is stored in a memory 140a.

Then, the stored right boundary area Bda is transmitted to the second image display apparatus 100b, to be stored in a memory 104b of the second image display apparatus 100b.

Subsequently, the second image display apparatus 100b receives, through an interface 130b, an image imgbb to be displayed at the second time point.

The controller 170b synthesizes the right boundary area BDa, stored in the memory 104b, with the input image imgbb.

During the synthesis, the controller 170b may add the right boundary area BDa to the left side of the input image imgbb. As shown in the synthesized image Imgx, the image may be an image with an enlarged transverse area.

Accordingly, for display on the display 180b, the controller 10b may select a partial area imgcb of the synthesized image Imgx, and may transmit the selected area Imgcb to the display 180b.

Accordingly, the image Imgcb, from which the right area is removed, and which corresponds to the selected area, may be displayed on the second display 180b at the second time point.

Accordingly, by performing pixel shifting for reducing an afterimage caused by burn-in, an image having no black area may be displayed on the entire video wall 10.

Particularly, the black area does not occur on each boundary area of the video wall 10. Accordingly, a user may view a smooth video, which improves visibility.

Meanwhile, while the video displayed on the plurality of image display apparatuses 100a to 100d is repeatedly played back, a movement amount of the pixel shift may vary at each scene change.

Figure 17:
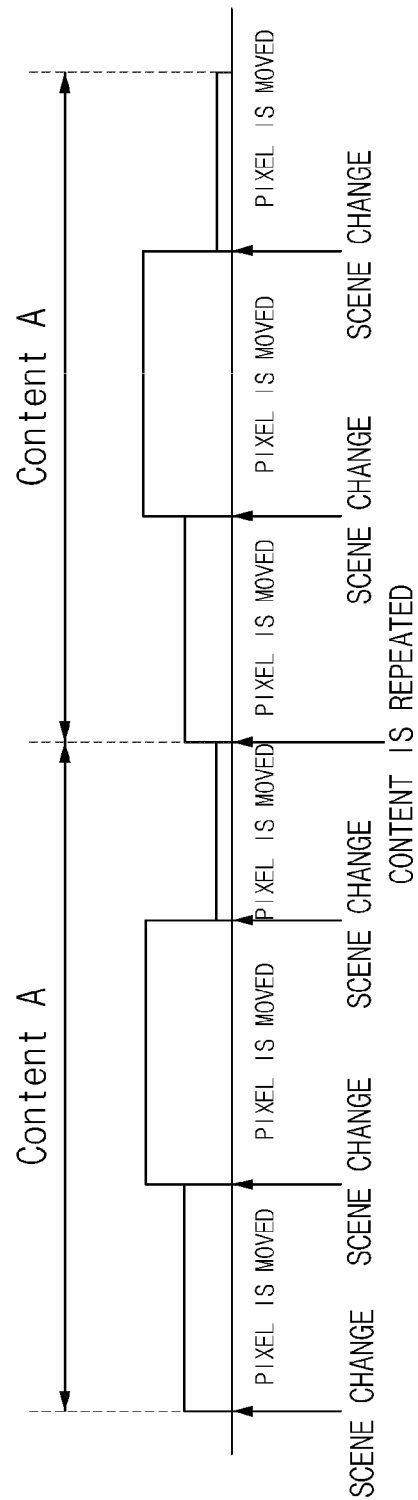

FIG. 17 illustrates an example in which as content A is repeatedly played back, a scene change occurs.

Referring to the drawing, when content A is played back, a plurality of scene changes may occur. In the drawing, an example is illustrated in which three scene changes occur.

At a first scene change, pixel shifting may be performed at a first level; at a second scene change, pixel shifting may be performed at a second level greater than the first level; and at a third scene change, pixel shifting may be performed at a third level less than the first level.

By performing pixel shifting at the third level, pixel movement is minimized such that visibility may not be affected, and by performing pixel shifting at the second level, the effect of reducing burn-in may be greatly enhanced as the movement is maximized.

As described above, by varying an amount of pixel shift according to a scene change while a video is repeatedly played back, images may be displayed with reduced black areas, while performing pixel shifting for reducing an afterimage caused by burn-in.

FIGS. 10A to 17 illustrate an example of a video wall 10 having 2*2 image display apparatuses, but unlike the drawings, a video wall may comprise various numbers of image display apparatuses.

For example, the video wall may also comprise 1*4 image display apparatuses, or 4*1 image display apparatuses, or 3*3 image display apparatuses.

Figure 18:
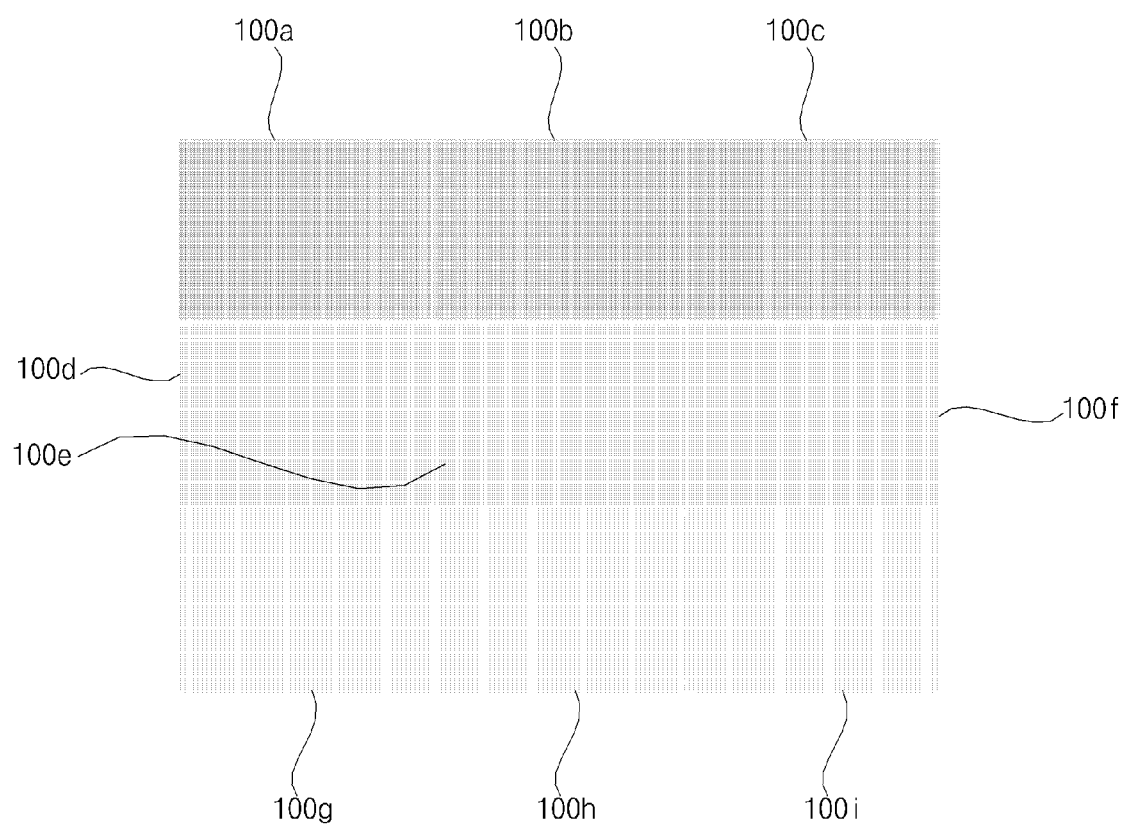

FIG. 18 illustrates a video wall 20 having 3*3 image display apparatuses, in which nine image display apparatuses 100a to 100i of 3*3 are provided.

In FIG. 19, (a) illustrates a single image Imgob, and (b) illustrates an example in which the single image Imgob is divided into nine images of 3*3.

As described above, among the nine image display apparatuses, an image imgen displayed on an image display apparatus disposed at the center, i.e., a fifth image display apparatus 100e may store an upper boundary area BDua, a right boundary area BDra, a left boundary area BDla, and a lower boundary area BDda and may transmit the stored boundary areas to adjacent image display apparatuses.

Accordingly, the occurrence of black areas may be reduced while reducing the afterimage on the video wall 20, on which a video is repeatedly displayed.

While the present disclosure has been particularly shown and described with reference to preferred embodiments thereof, it will be understood by those skilled in the art that the present disclosure is not limited to those exemplary embodiments and various changes in form and details may be made therein without departing from the scope and spirit of the invention as defined by the appended claims and should not be individually understood from the technical spirit or prospect of the present disclosure.

What is claimed is:

1. A video wall comprising:
a plurality of displays disposed adjacent to each other;
an image divider configured to divide an input image into a plurality of images to be displayed on the plurality of displays; and
at least one controller configured to control a plurality of image display apparatuses corresponding to the plurality of displays,
wherein in response to a video displayed on the plurality of image display apparatuses being repeatedly played back, the controller is configured to store a boundary area displayed on the plurality of image display apparatuses and transmit the stored boundary area to adjacent image display apparatuses, and respective image display apparatuses synthesize a received boundary area with an image area to be displayed, and display a portion of the synthesized image,
wherein in response to a video displayed on the plurality of image display apparatuses being repeatedly played back, the controller is configured to sequentially transmit boundary regions of each image frame of the video in synchronization with each image frame of the video to the adjacent image display apparatuses,
wherein while the video displayed on the plurality of image display apparatuses is repeatedly played back, a movement amount of pixel shift changes at each scene change, and
wherein as the movement amount of pixel shift changes at each scene change, a size of the boundary area changes.

2. The video wall of claim 1, wherein a controller of a first image display apparatus, among the plurality of image display apparatuses, is configured to determine whether the video displayed on the plurality of image display apparatuses is repeatedly played back, and in response to the video displayed on the plurality of image display apparatuses being repeatedly played back, store the boundary area and generates a synthetic image.

3. The video wall of claim 1, wherein in response to performing pixel shifting while the video displayed on the plurality of image display apparatuses is repeatedly played back, a controller of a first image display apparatus, among the plurality of image display apparatuses, is configured to transmit direction information of the pixel shifting to the plurality of image display apparatuses.

4. The video wall of claim 1, wherein while the video displayed on the plurality of image display apparatuses is repeatedly played back, a controller of a first image display apparatus, among the plurality of image display apparatuses, is configured to perform pixel shifting collectively on the plurality of image display apparatuses.

5. The video wall of claim 1, wherein in response to performing pixel shifting in a first direction at a first time point while the video displayed on the plurality of image display apparatuses is repeatedly played back:
among the plurality of image display apparatuses, a first image display apparatus transmits a first boundary area in the first direction, which is displayed on the first image display apparatus, to a second image display apparatus disposed adjacent to the first direction; and
the second image display apparatus synthesizes an input image with the first boundary area to generate a synthetic image, and displays the synthetic image except for the boundary area in the first direction.

6. The video wall of claim 5, wherein in response to performing pixel shifting in a second direction at a second time point after the first time point while the video displayed on the plurality of image display apparatuses is repeatedly played back:
the first image display apparatus transmits a second boundary area in the second direction, which is displayed on the first image display apparatus, to a third image display apparatus disposed adjacent to the second direction; and the third image display apparatus synthesizes an input image with the second boundary area to generate a synthetic image, and displays the synthetic image except for the boundary area in the third direction.

7. The video wall of claim 6, wherein while the video displayed on the plurality of image display apparatuses is repeatedly played back when the second image display apparatus is disposed in the first direction of the first image display apparatus and the third image display apparatus is disposed in the second direction, among the plurality of image display apparatuses, if, at the first time point, shifting in the first direction is performed by the second image display apparatus and shifting in the third direction is performed by the third image display apparatus:

the second image display apparatus synthesizes an input image with the first boundary area in the first direction, which is displayed on the first image display apparatus, to generate a synthetic image, and displays the synthetic image except for the boundary area in the first direction; and the third image display apparatus synthesizes an input image with the second boundary area in the second direction, which is displayed on the first image display apparatus, to generate a synthetic image, and displays the synthetic image except for the boundary area in the second direction.

8. The video wall of claim 1, wherein while the video displayed on the plurality of image display apparatuses is repeatedly played back, the respective image display apparatuses perform different pixel shifting operations, and wherein the respective image display apparatuses generate a synthesized area based on a boundary area of adjacent image display apparatuses and an input image, and display an image of the synthesized area except for a boundary area in a pixel shifting direction.

9. The video wall of claim 1, wherein while the video displayed on the plurality of image display apparatuses is repeatedly played back, an image of the boundary area is transmitted sequentially to adjacent image display apparatuses.

10. The video wall of claim 1, wherein the plurality of image display apparatuses have one or more organic light emitting diode panels.

11. A video wall comprising:
a plurality of displays disposed adjacent to each other;
an image divider configured to divide an input image into a plurality of images to be displayed on the plurality of displays; and
at least one controller configured to control a plurality of image display apparatuses corresponding to the plurality of displays, wherein in response to a video displayed on the plurality of image display apparatuses being repeatedly played back, a first boundary image in a first image, which is input to a first image display apparatus among the plurality of image display apparatuses, is synthesized with a second image which is input to a second image display apparatus disposed adjacent to the first image display apparatus, and a portion of the synthesized image is displayed on the second image display apparatus, wherein in response to a video displayed on the plurality of image display apparatuses being repeatedly played back, the controller is configured to sequentially transmit the first boundary image of each image frame of the video in synchronization with each image frame of the video to the second image display apparatus, wherein while the video displayed on the plurality of image display apparatuses is repeatedly played back, a movement amount of pixel shift changes at each scene change, and wherein as the movement amount of pixel shift changes at each scene change, a size of the boundary area changes.

12. The video wall of claim 11, wherein a controller of the first image display apparatus is configured to determine whether the video displayed on the plurality of image display apparatuses is repeatedly played back, and in response to the video displayed on the plurality of image display apparatuses being repeatedly played back, transmit the first boundary image in the first image, which is input to the first image display apparatus to the second image display apparatus.

13. The video wall of claim 11, wherein a controller of the second image display apparatus is configured to synthesize the first boundary image received from the first image display apparatus with a second image, and display a portion of the synthesized image on a display of the second image display apparatus.

14. The video wall of claim 11, wherein in response to the video displayed on the plurality of image display apparatuses being repeatedly played back, the controller is configured to extract eigenvalues of each input frame, compare the eigenvalues, determine whether a currently input frame is repeated and determine a position of the repeated frame.

15. The video wall of claim 11, wherein the plurality of image display apparatuses have one or more organic light emitting diode panels.

* * * * *